(12) United States Patent
Gelardi et al.

(10) Patent No.: US 7,753,198 B2
(45) Date of Patent: Jul. 13, 2010

(54) PACKAGING FOR MULTIPLE MEDIA DISCS AND METHODS FOR MAKING SAME

(75) Inventors: John A. Gelardi, Kennebunkport, ME (US); Richard C. Thibault, Bromall, PA (US); Peter L. Gidion, New York, NY (US); Kaman Sin, Brooklyn, NY (US)

(73) Assignee: MeadWestvaco Corporation, Richmond, VA (US)

( * ) Notice: Subject to any disclaimer, the term of this patent is extended or adjusted under 35 U.S.C. 154(b) by 1092 days.

(21) Appl. No.: 11/060,576

(22) Filed: Feb. 18, 2005

(65) Prior Publication Data
US 2005/0189244 A1    Sep. 1, 2005

Related U.S. Application Data

(62) Division of application No. 10/259,341, filed on Sep. 27, 2002, now Pat. No. 7,070,048.

(60) Provisional application No. 60/339,510, filed on Dec. 11, 2001.

(51) Int. Cl.
    *B65D 85/57*    (2006.01)
(52) U.S. Cl. ........................ 206/232; 206/313
(58) Field of Classification Search .............. 206/308.1, 206/232, 312, 313, 557
See application file for complete search history.

(56) References Cited

U.S. PATENT DOCUMENTS

| | | | |
|---|---|---|---|
| 3,463,353 A | 8/1969 | Peebles | |
| 3,469,686 A | 9/1969 | Gutsche et al. | |
| 4,327,831 A * | 5/1982 | Inaba et al. | 206/310 |
| 4,823,950 A * | 4/1989 | Roze | 206/311 |
| 4,844,260 A | 7/1989 | Jaw | |
| 4,892,189 A | 1/1990 | Kunimune et al. | |
| 4,917,242 A | 4/1990 | Jeruzal | |
| 4,972,951 A | 11/1990 | Vartanian | |
| 5,255,816 A | 10/1993 | Trepp | |
| 5,344,008 A * | 9/1994 | DeBlasio et al. | 206/256 |

(Continued)

FOREIGN PATENT DOCUMENTS

CH    678370 A5    8/1991

(Continued)

OTHER PUBLICATIONS

International Search Report WO2003050812A3, dated May 23, 2003.

*Primary Examiner*—Jacob K Ackun, Jr.
(74) *Attorney, Agent, or Firm*—Thomas A. Boshinski

(57) ABSTRACT

A package for holding multiple media discs includes a hinged tray assembly, which includes a plurality of disc-holding trays, each tray having a hinge edge. The trays are positioned with respect to each other such that when the tray assembly is in a closed configuration, the trays are arranged in a stack with their hinge edges lined up with each other at a hinge side of the tray assembly. The trays are hinged to each other by a flexible hinge member that is affixed to the hinge edges of the trays. The package further includes a jacket, comprising a plurality of panels that fold around the tray assembly. The jacket includes an interior surface to which a bottom surface of the tray assembly is mounted, the plurality of panels folding around the tray assembly to close the package.

15 Claims, 28 Drawing Sheets

U.S. PATENT DOCUMENTS

| | | |
|---|---|---|
| 5,575,387 A | 11/1996 | Gelardi |
| 5,615,773 A | 4/1997 | Sturdivant |
| 5,657,870 A * | 8/1997 | Schottle et al. .......... 206/459.5 |
| 5,671,856 A | 9/1997 | Lisch |
| 5,715,933 A | 2/1998 | Monahan |
| 5,727,681 A | 3/1998 | Li |
| 5,749,464 A | 5/1998 | Cheris et al. |
| 5,765,695 A | 6/1998 | Picciallo |
| 5,799,782 A | 9/1998 | Gelardi |
| 5,839,576 A | 11/1998 | Kim |
| 6,179,121 B1 | 1/2001 | Ferguson et al. |
| 6,199,689 B1 | 3/2001 | Higuchi et al. |
| H1954 H | 4/2001 | Takashima |
| 6,360,890 B1 | 3/2002 | Proffit |
| 6,626,290 B2 | 9/2003 | Byrne et al. |
| 6,702,331 B2 | 3/2004 | Derraugh et al. |
| 7,070,048 B2 | 7/2006 | Gelardi et al. |
| 7,325,677 B2 | 2/2008 | Gelardi et al. |
| 2002/0038770 A1 | 4/2002 | Liu |
| 2006/0289318 A1 | 12/2006 | Gelardi et al. |
| 2007/0000803 A1 | 1/2007 | Gelardi et al. |

FOREIGN PATENT DOCUMENTS

| | | |
|---|---|---|
| DE | 29518620 U1 | 1/1996 |
| EP | 0420387 A | 4/1991 |
| EP | 0729850 A1 | 9/1996 |
| EP | 0801012 A | 10/1997 |
| EP | 1205936 A | 5/2002 |
| JP | 7-24790 | 5/1995 |
| JP | 10147391 A | 6/1998 |
| WO | WO2004/071784 | 8/2004 |
| WO | WO2004071785 A2 | 8/2004 |
| WO | WO2005006336 A | 1/2005 |

* cited by examiner

PACKAGING FOR MULTIPLE MEDIA DISCS AND METHODS FOR MAKING SAME

CROSS-REFERENCE TO RELATED APPLICATIONS

The present application is a divisional of U.S. patent application Ser. No. 10/259,341, filed on Sep. 27, 2002, assigned to the assignee of the present application, which is incorporated herein by reference in its entirety, and which claims the benefit of U.S. Provisional Patent Application Ser. No. 60/339,510, filed on Dec. 11, 2001.

BACKGROUND OF THE INVENTION

1. Field of the Invention

The present invention relates generally to improvements to product packaging, and more particularly to advantageous aspects of packaging for holding multiple media discs and methods for making same.

2. Description of the Prior Art

Numerous packages have been developed for holding media discs. The basic media disc package is the so-called "jewel case," which typically includes a tray for holding a media disc, and a hinged cover that snaps into place over the tray. Jewel cases have been developed to hold two media discs. One such jewel case includes a two-sided central tray that receives a media disc on each side. Another jewel case provides for two media discs to be stacked, one on top of each other, in the same tray. However, neither of these designs is entirely satisfactory for a number of reasons, including ease of use and esthetic appearance. Further, it is becoming increasingly common for media discs to be packaged in sets having more than two discs.

There is thus a need for easy-to-use, esthetically appealing packaging for holding multiple media discs that can be manufactured at an acceptably low cost.

SUMMARY OF THE INVENTION

An aspect of the invention provides a package for holding media discs. The package comprises a hinged tray assembly, which includes a plurality of disc-holding trays, each tray having a hinge edge. The trays are positioned with respect to each other such that when the tray assembly is in a closed configuration, the trays are arranged in a stack with their hinge edges lined up with each other at a hinge side of the tray assembly. The trays are hinged to each other by a flexible hinge member that is affixed to the hinge edges of the trays. The package further includes a jacket, comprising a plurality of panels that fold around the tray assembly. The jacket includes an interior surface to which a bottom surface of the tray assembly is mounted, the plurality of panels folding around the tray assembly to close the package.

Additional features and advantages of the present invention will become apparent by reference to the following detailed description and accompanying drawings.

DETAILED DESCRIPTION

As used herein, the term "media disc" refers to a compact disc (CD), digital video disc (DVD), or other disc or disc-shaped media item that is used to store analog or digital information.

Figure 1:
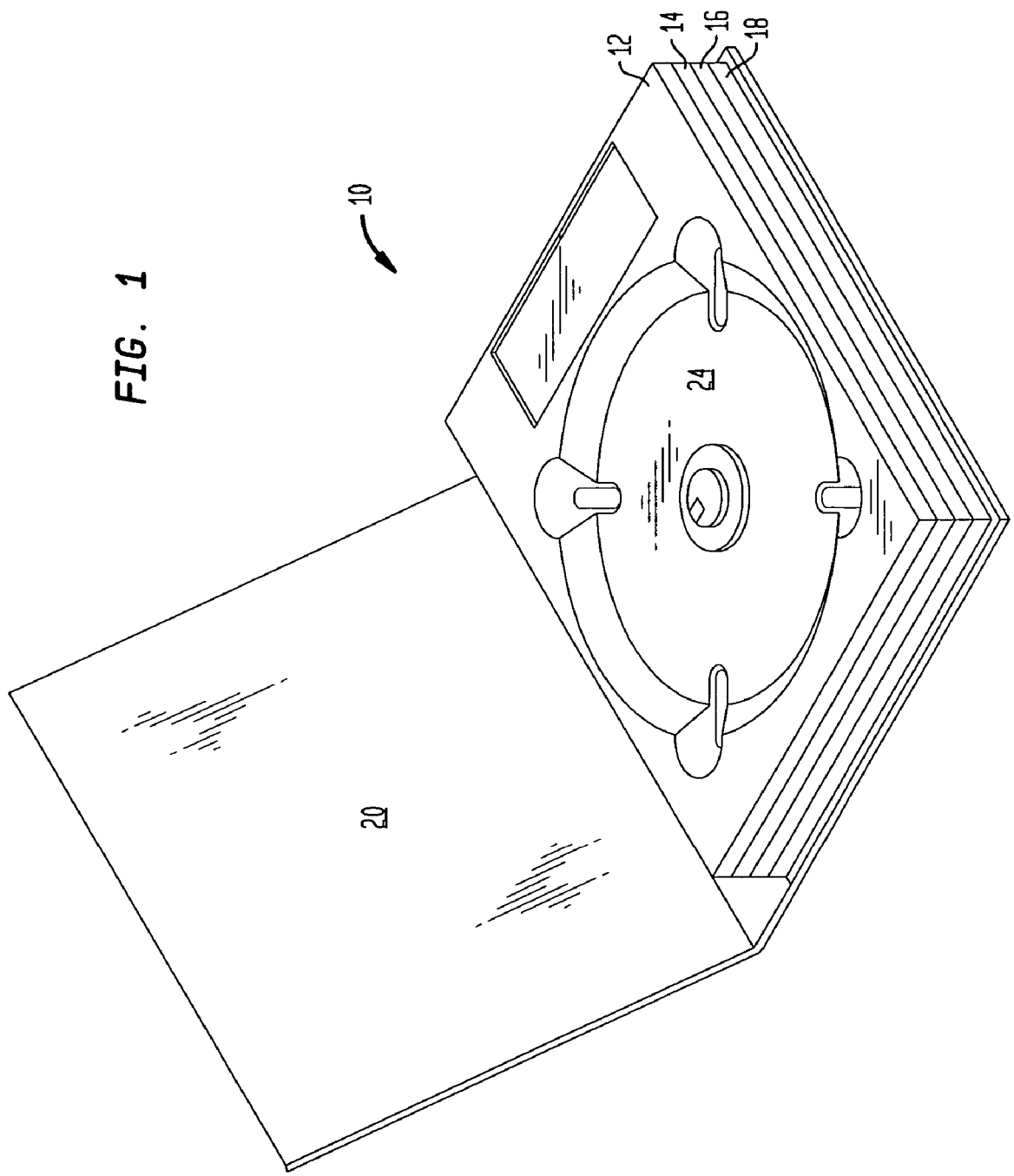
FIG. 1 shows a perspective view of a package for holding media discs according to a first aspect of the invention.
Figure 2:
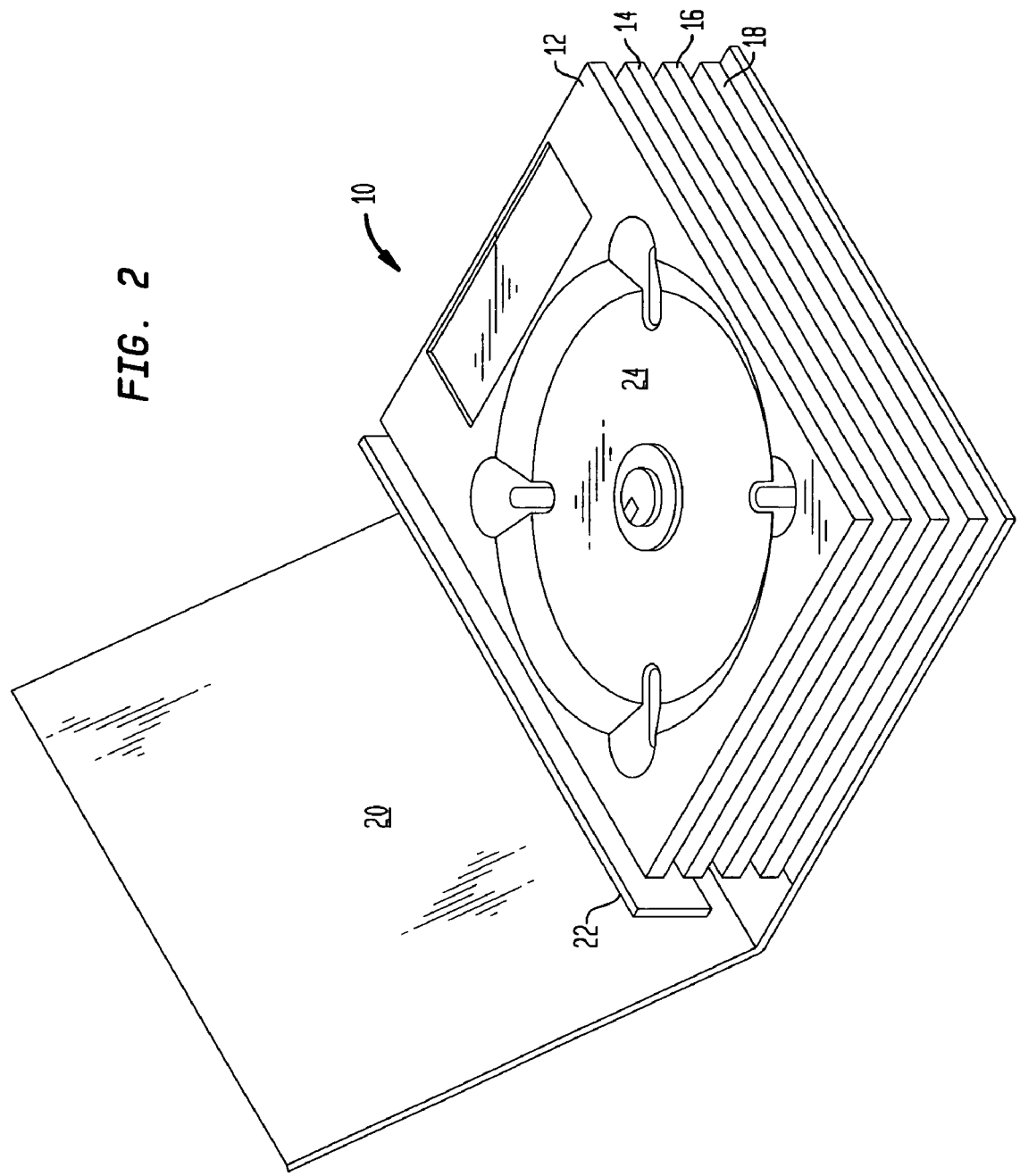
FIG. 2 shows an exploded perspective view of the package shown in FIG. 1.

FIG. 1 shows a perspective view, and FIG. 2 shows an exploded perspective view, of a media package 10 according to a first aspect of the invention. The media package 10 includes a plurality of disc-holding trays 12, 14, 16 and 18 that are arranged in a stack. As shown in FIG. 2, the trays are hinged to each other by a flexible hinge member 22 that is affixed to one side of the stack of trays. In one embodiment, the stack of trays is mounted onto an interior panel of an outer jacket 20. Alternatively, the stack of trays may be inserted into an open-ended sleeve or other carrier.

The hinge member 22 is fabricated from a suitable material, such as a styrene-based film or tape, polyethylene, polypropylene, or the like. The hinge member 22 may be fabricated, for example, from a strip of commercially available poly tape. The hinge member 22 must be flexible enough to allow the package 10 to be opened and closed freely, but must be strong enough to prevent premature failure of the hinge member or separation of the tray stack from the jacket 20. The hinge member may be affixed to the trays using an adhesive, or using a mechanical technique, including techniques using ultrasound or heat. In addition, the stack of trays 12, 14, 16 and 18 may be hinged in a number of different configurations without departing from the spirit of the invention. In the package 10 shown in FIG. 1, the hinge member 22 is positioned proximate to the spine of the jacket 20, in a parallel relationship with the folds in the jacket 20. However, it would also be possible to position the hinge member 22 distal from the spine of the jacket 20, or in a transverse relationship with the folds in the jacket 20.

Figure 3:
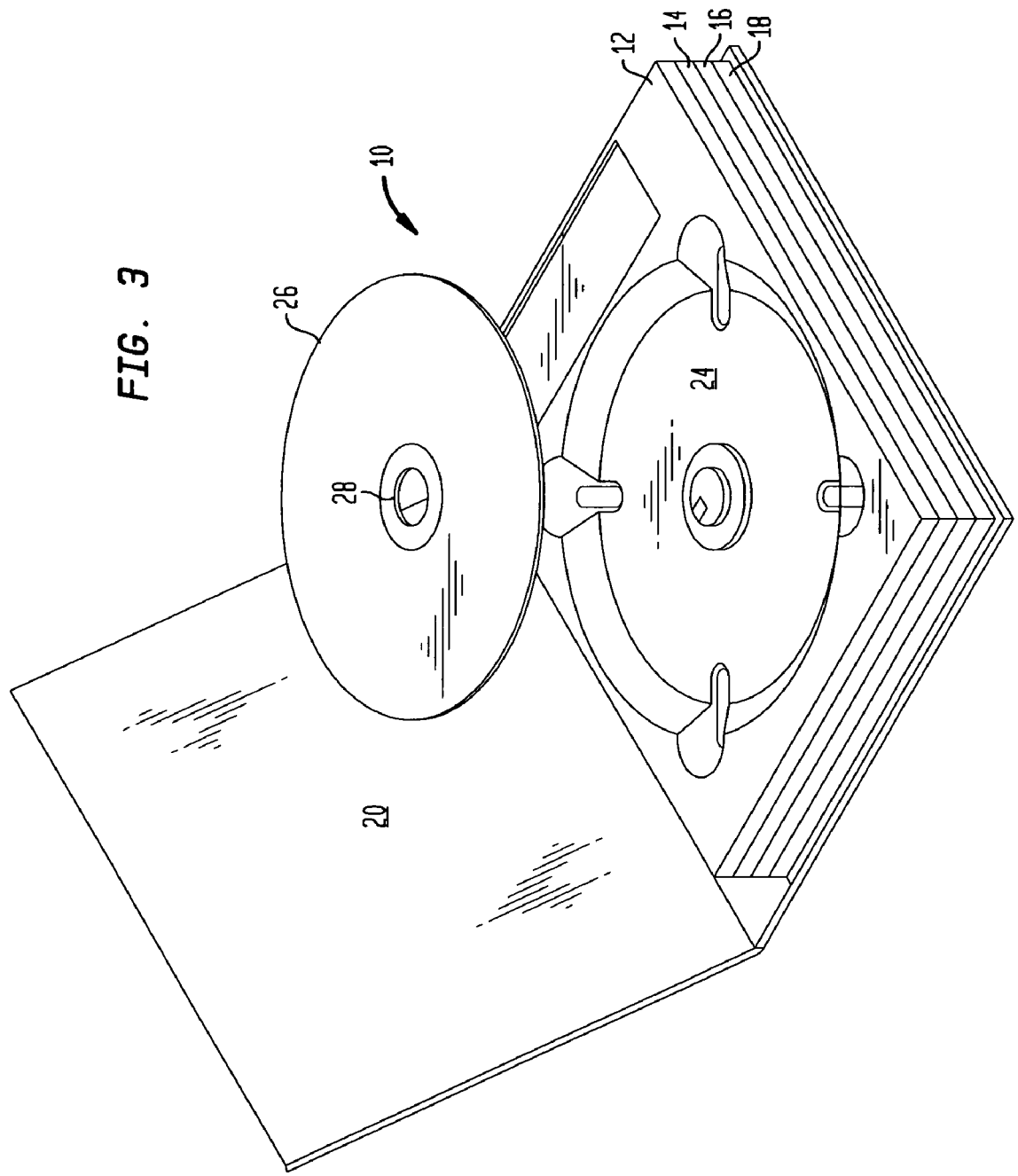
FIG. 3 shows a perspective view of the package shown in FIG. 1 illustrating the placement of a media disc into the package.
Figure 4:
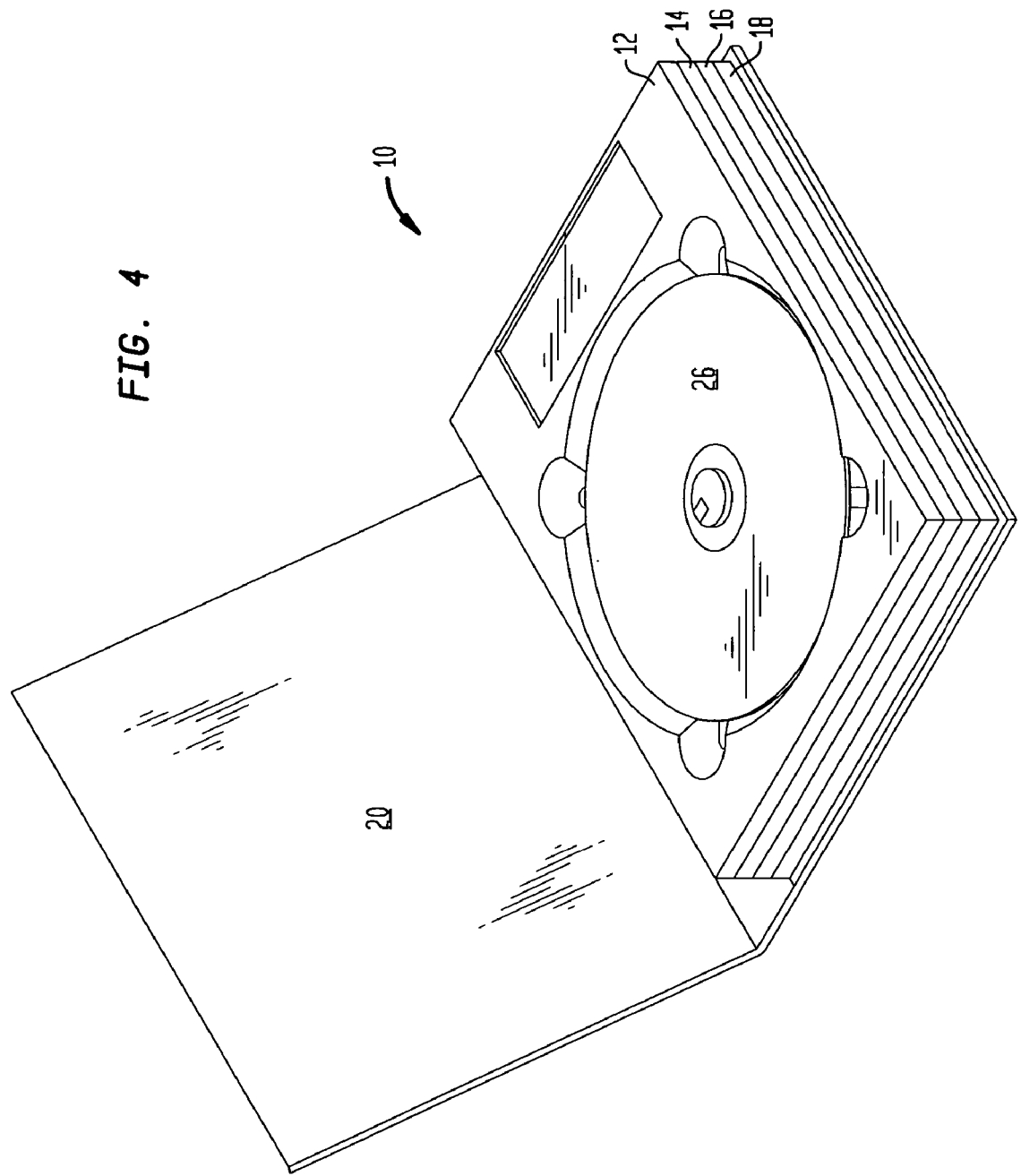
FIG. 4 shows a perspective view of the package shown in FIG. 1, with a media disc seated in a disc-holding tray in the package.

Each tray in the package 10 includes a cavity 24 for receiving a media disc. FIGS. 3 and 4 are perspective views of the package 10 shown in FIGS. 1 and 2, illustrating the placement of a media disc 26 into the cavity 24 in the top tray 12. As shown in FIG. 3, media discs commonly include a central spindle hole 28. As described below, the spindle hole 28 can be used to help hold the disc in position in a tray. In FIG. 4, the media disc 26 has been seated in the cavity 24.

Figure 5:
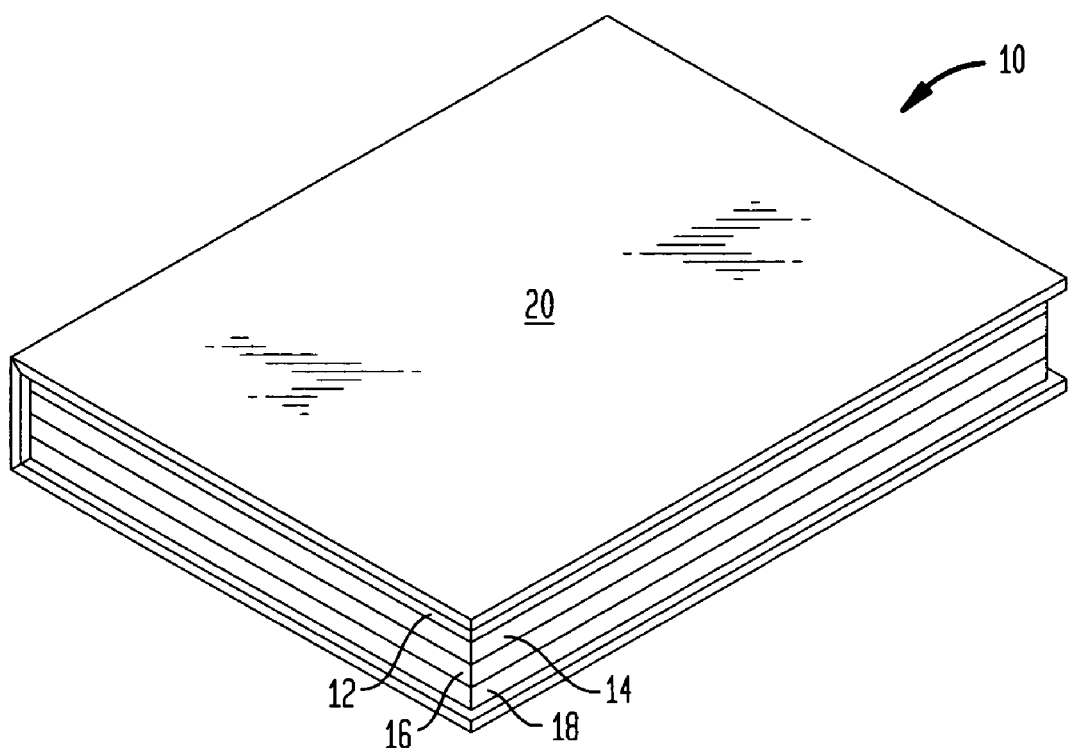
FIG. 5 shows a perspective view of the package shown in FIG. 1 in a closed configuration.

FIG. 5 shows a perspective view of the package 10 shown in FIG. 1 in a closed configuration, with the jacket 20 folded around the stack of trays 12, 14, 16 and 18. As shown in FIG. 5, the result is a compact boxlike structure.

Figure 6:
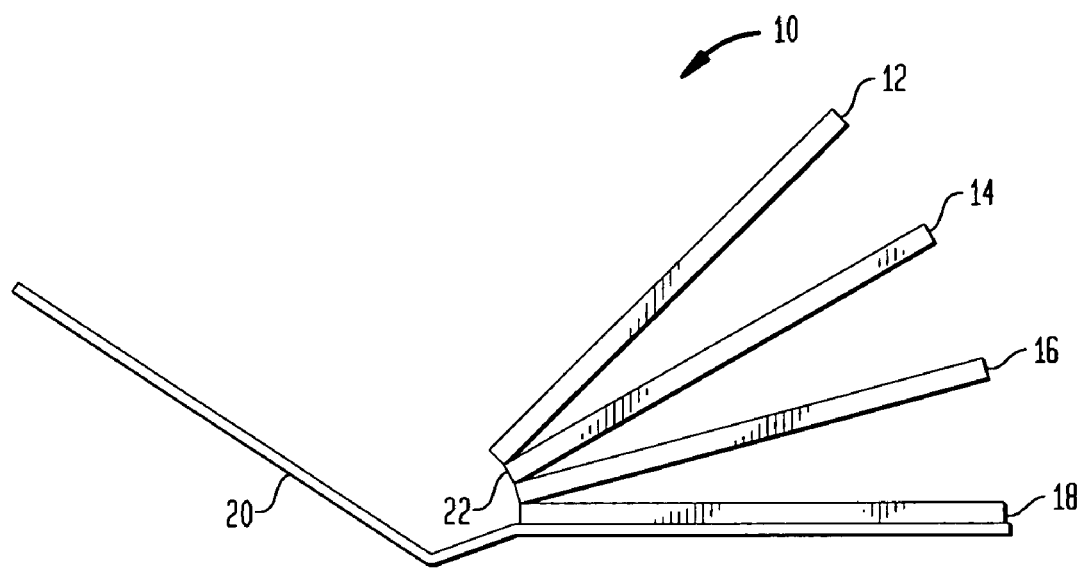
FIG. 6 shows an end view of the package shown in FIG. 1, with the disc-holding trays fanned into an open position.
Figure 7:
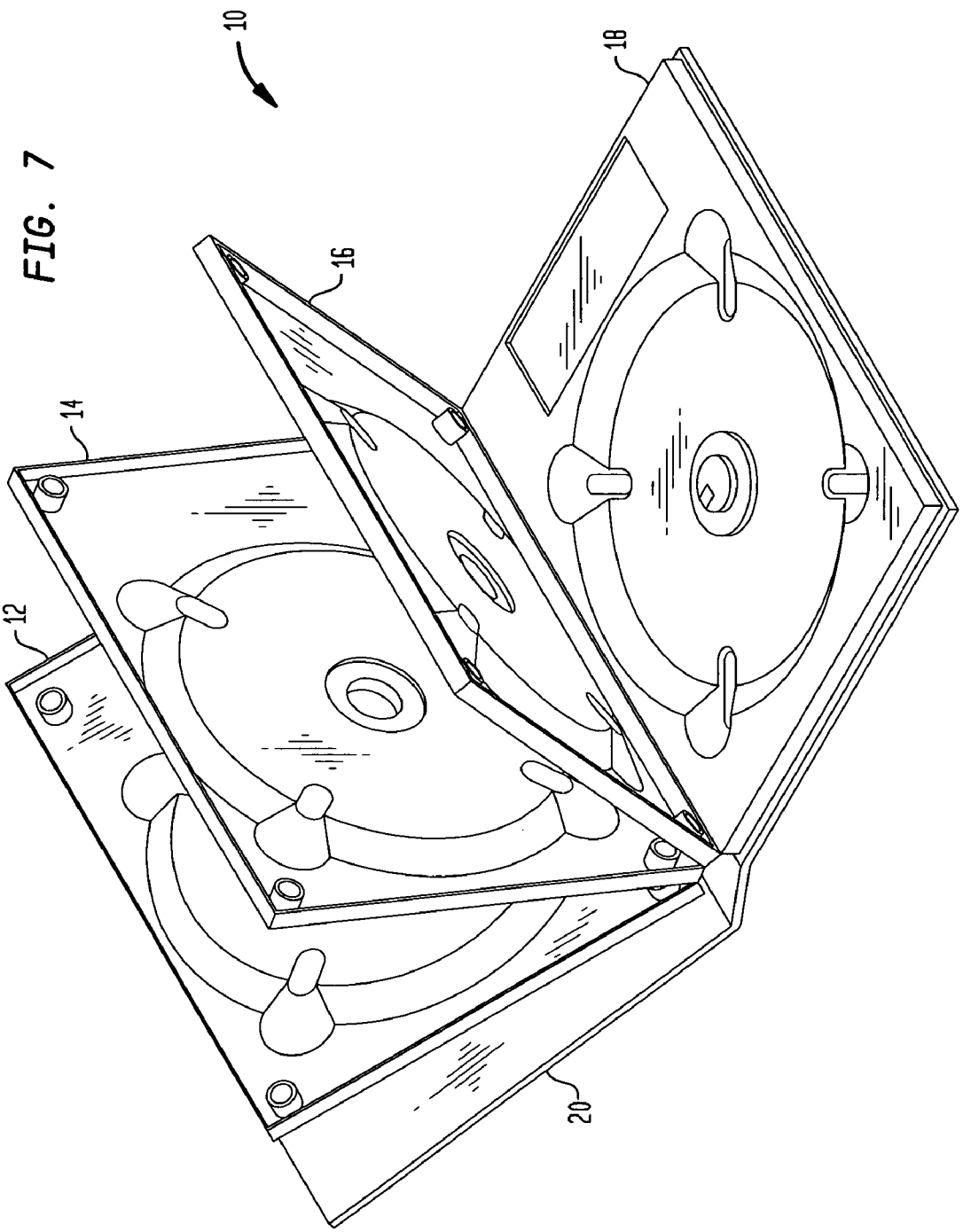
FIG. 7 shows a perspective view of the package shown in FIG. 1, with the disc-holding trays fanned into an open position.
Figure 8:
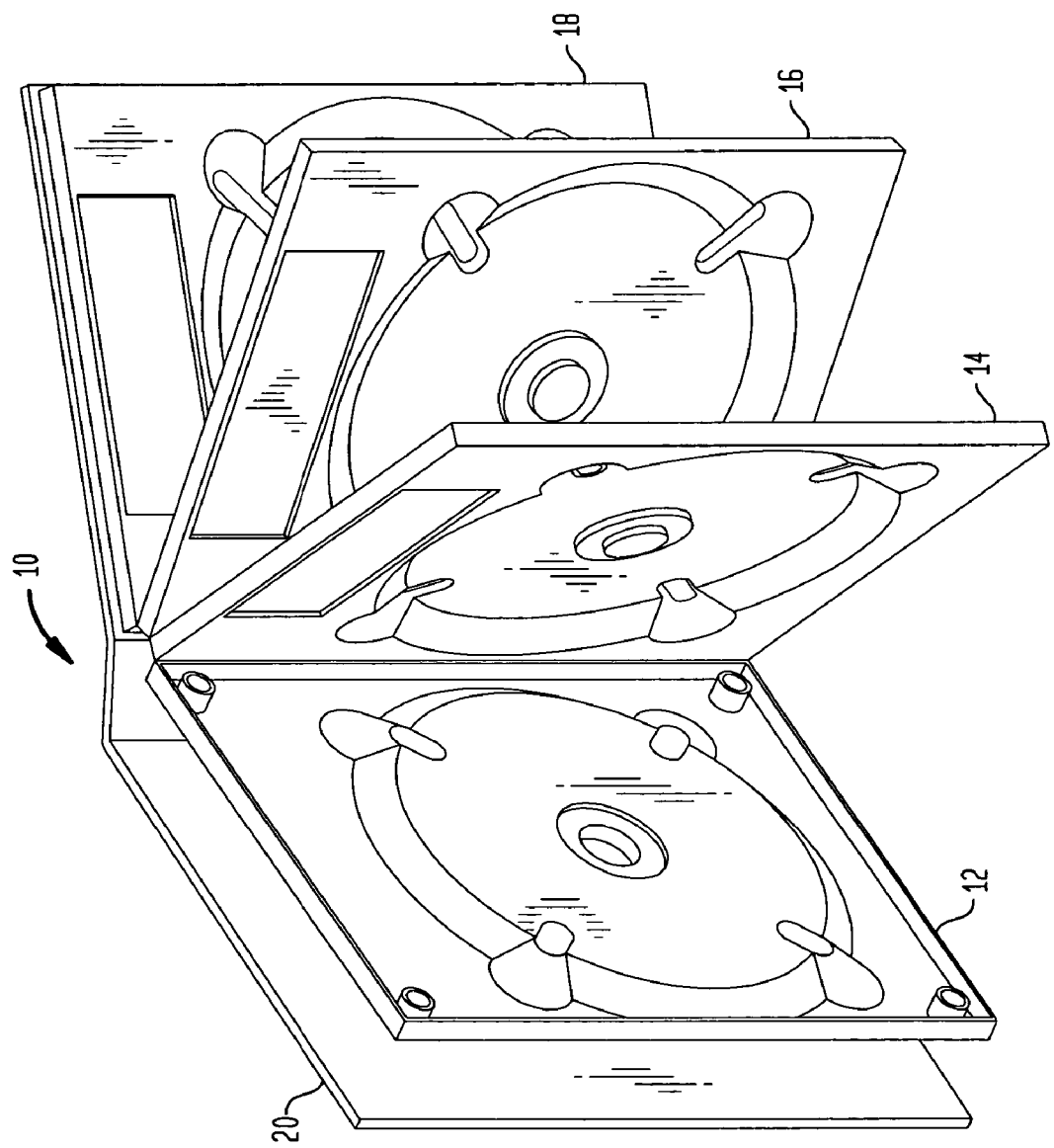
FIG. 8 shows a perspective view of the package shown in FIG. 1, with the disc-holding trays fanned into an open position, and with the package stood on one end.

FIG. 6 shows an end view of the package 10 in an open configuration. The jacket 20 has been opened, and the trays 12, 14, 16 and 18 have been fanned apart from each other, anchored by the hinge member 22. FIG. 7 shows a perspective view of the open package 10. FIG. 8 shows that, when the trays have been fanned into an open position, the package 10 can be stood upright. The package may be stood on end, for example, to display the package 10 and its contents in a retail environment.

Figure 9:
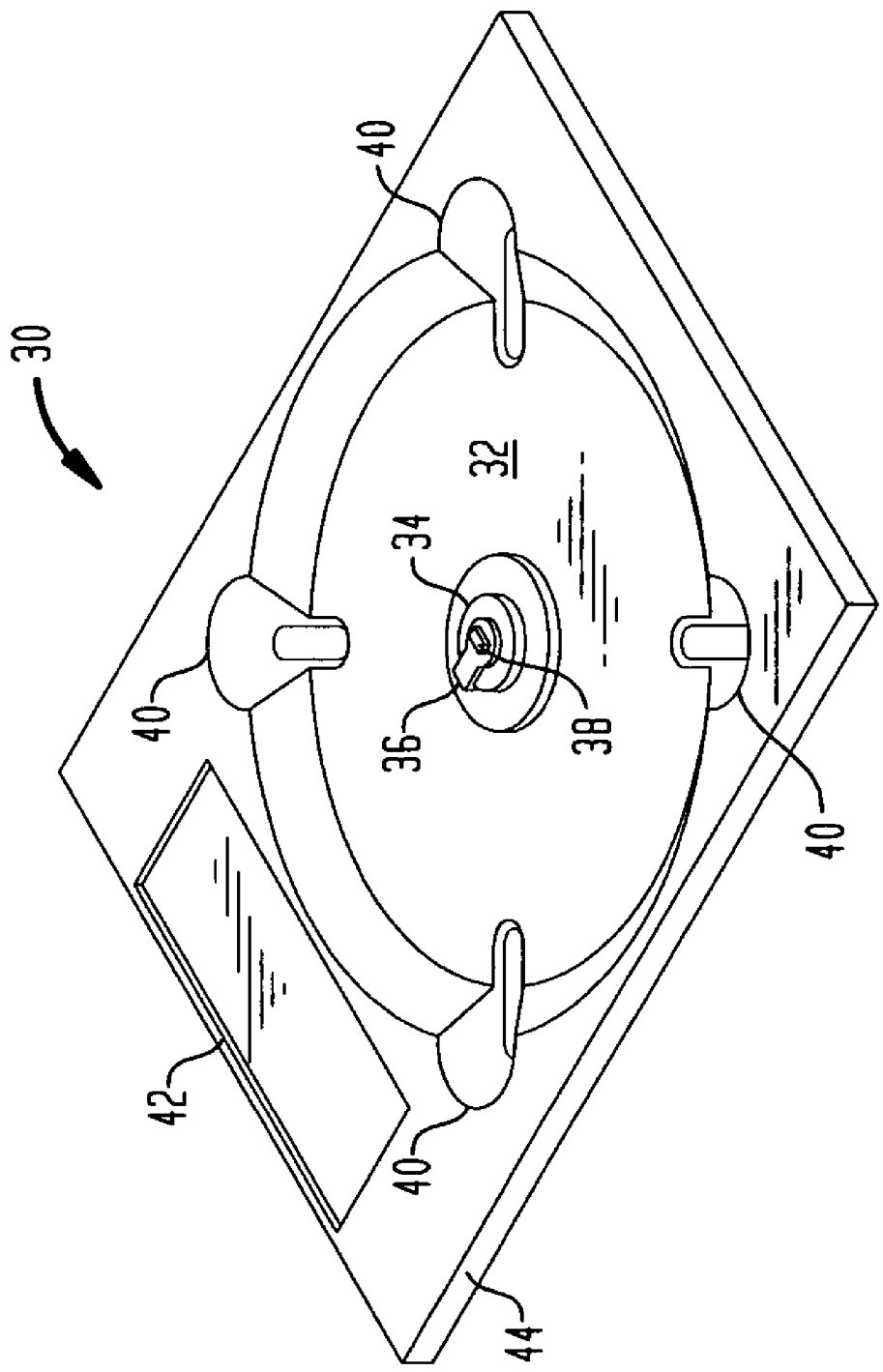
FIG. 9 shows a perspective view of a single disc-holding tray suitable for use in accordance with an aspect of the invention.

FIG. 9 shows a perspective view of a tray 30 that is suitable for use in a media package according to the present invention. The tray 30 includes a central cavity 32 that is shaped to closely receive a media disc. At the center of the cavity 32, a hub 34 is shaped and positioned to closely fit within a media disc's central spindle hole 28 when the disc is seated in the cavity 32. The hub 34 includes a small locking tab 36 which engages the rim of the media disc's central spindle hole to prevent the disc from accidentally becoming disengaged from the cavity 32. The hub 34 further includes a release button 38, which, when depressed, causes the locking tab 36 to retract, thereby allowing the media disc to be removed from the cavity 32. The tray 30 further includes four indentations 40 which are provided to provide access to a user's fingers to facilitate the removal of a disk from the cavity 32. In addition, the tray includes a region 42 for receiving labeling information. Information may be molded directly within this region 42, or may be printed onto a separate sheet of paper or plastic and then affixed in the region 42.

The tray 30 includes an edge 44, referred to herein as a "hinge edge," that is used to hinge the tray 30 to other trays. The hinge edge 44 is positioned such that when a plurality of trays are stacked on top of each other, the hinge edges 44 are lined up with each other to receive a hinge member, such as the hinge member 22 shown in FIG. 2.

The style, shape, and dimensions of the tray 30, including the number of indentations therein and the design and shape of the hub 34, may be varied and are not limited in any way by this disclosure. The tray 30 may suitably be fabricated from a plastic material that has been injection molded. Suitable materials for the tray include polystyrene and polypropylene. If desired, the tray 30 can be fabricated from a clear material, such as crystal styrene. The use of a clear material may be desirable from an esthetic point of view. Further, the use of a transparent material for the trays allows a user of the package to quickly determine whether any of the trays are empty.

Figure 10:
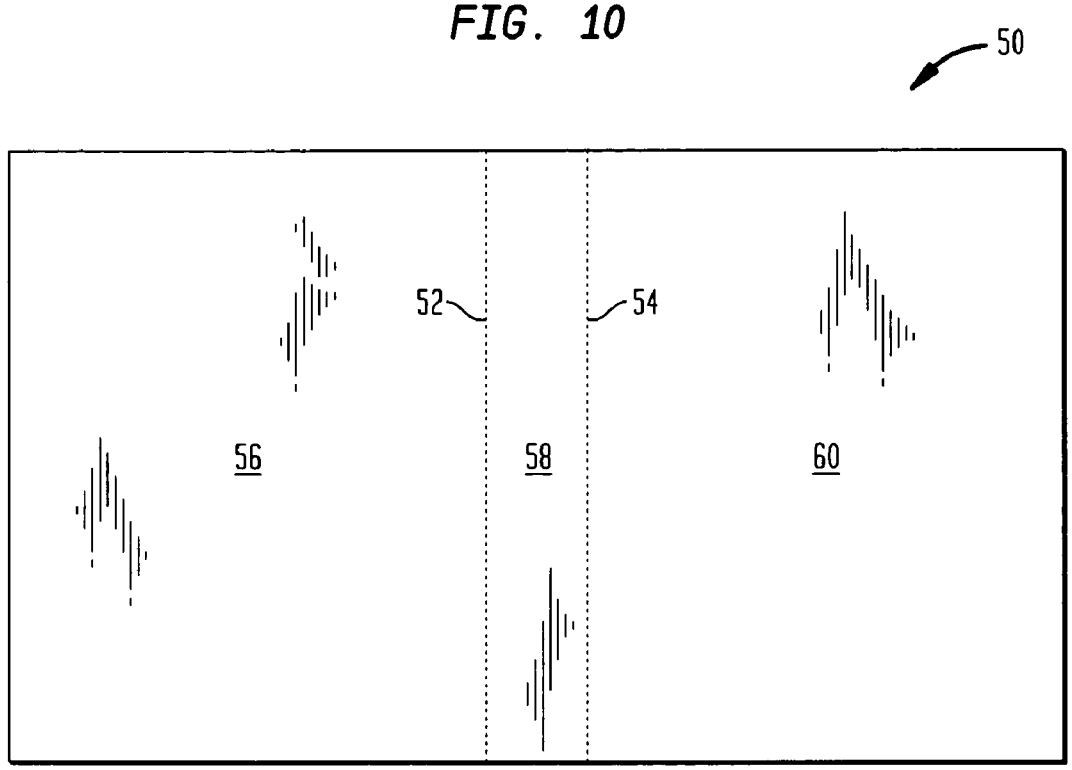
FIG. 10 shows a plan view of the interior surface of a jacket suitable for use in accordance with an aspect of the invention.

FIG. 10 shows a plan view of a jacket 50 suitable for use in some embodiments of the media package 10. FIG. 10 shows the interior side of the jacket 50. Prior to the addition of any text, graphics, and the like to the jacket 50, the exterior side of the jacket 50 is substantially identical in appearance to the interior side. According to one aspect of the invention, the jacket 50 is shaped such that it can be folded around a stack of trays mounted into the jacket 50 to form a boxlike package. The jacket may be fabricated from paper, paperboard, cardboard, plastic, or other suitable material. According to a further aspect of the invention, the jacket is fabricated from a material that is suitable for a high-speed printing process. As shown in FIG. 10, the jacket includes a pair of crease lines 52 and 54, which are used to fold the jacket 50 cleanly around a stack of trays mounted into the jacket. The crease lines 52 and 54 divide the jacket 50 into three sections: a front interior panel 56, a spine 58, and a rear interior panel 60. On the exterior side of the jacket 50 (not shown), the crease lines 52 and 54 further define a front exterior panel on the other side of the front interior panel 58, and a rear exterior panel on the other side of the rear interior panel 60. Thus, the jacket 50 shown in FIG. 10 is referred to as a "four-panel" design. It would be possible to include additional panels by increasing the length of the jacket 10 and providing additional creases, as needed. For example, the jacket 50 shown in FIG. 10 may be modified to incorporate a "six-panel" design.

The creases 52 and 54 may be introduced into the jacket using a number of different techniques. For example, if the jacket is fabricated from paperboard or cardboard, the creases can be introduced by pressing a scoring blade into the jacket. If the jacket is fabricated from plastic, the creases may be formed using an electron beam or other suitable technique.

It should be noted that the shape of the jacket may be modified, as desired, without departing from the spirit of the invention. For example, it may be desirable to include cutout regions in the jacket. Further, it may be desirable for portions of the jacket to extend beyond the perimeter of the stack of trays.

Figure 11:
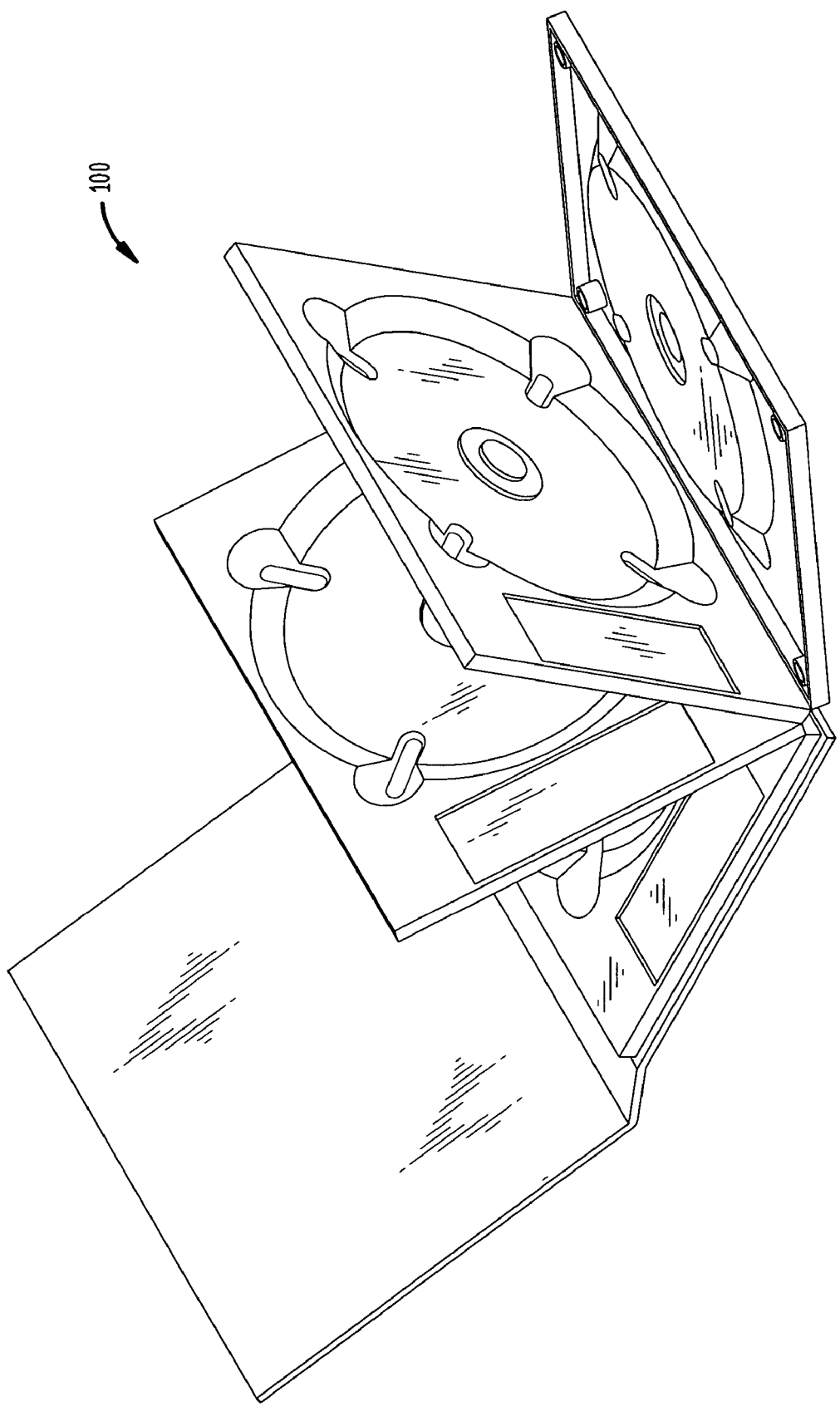
FIG. 11 shows a perspective view of a package for holding media discs in accordance with a further aspect of the invention.

FIG. 11 shows a perspective view of a media package 100 according to a further aspect of the invention, in which the stack of trays is hinged away from the spine of the jacket. There are certain differences between this location of the hinge and the location of the hinge shown in FIG. 1. First, depending on how the package is used, the location of the hinge away from the spine of the jacket may result in less strain on the package as it is unfolded. Second, hinging the trays to the outside of the jacket allows the inside front panel of the jacket to remain visible as the trays are fanned open. Thus, if informational content is printed on the inside front panel, this informational content will continue to be visible as each tray is fanned out. Further, if the package is opened for display, the location of the hinge along an outside edge of the jacket allows more of the package interior to be displayed. In other embodiments (not shown), the hinge edge may be located along the top edge of the jacket, such that the stack of trays may be opened by folding upward and outward.

Figure 12:
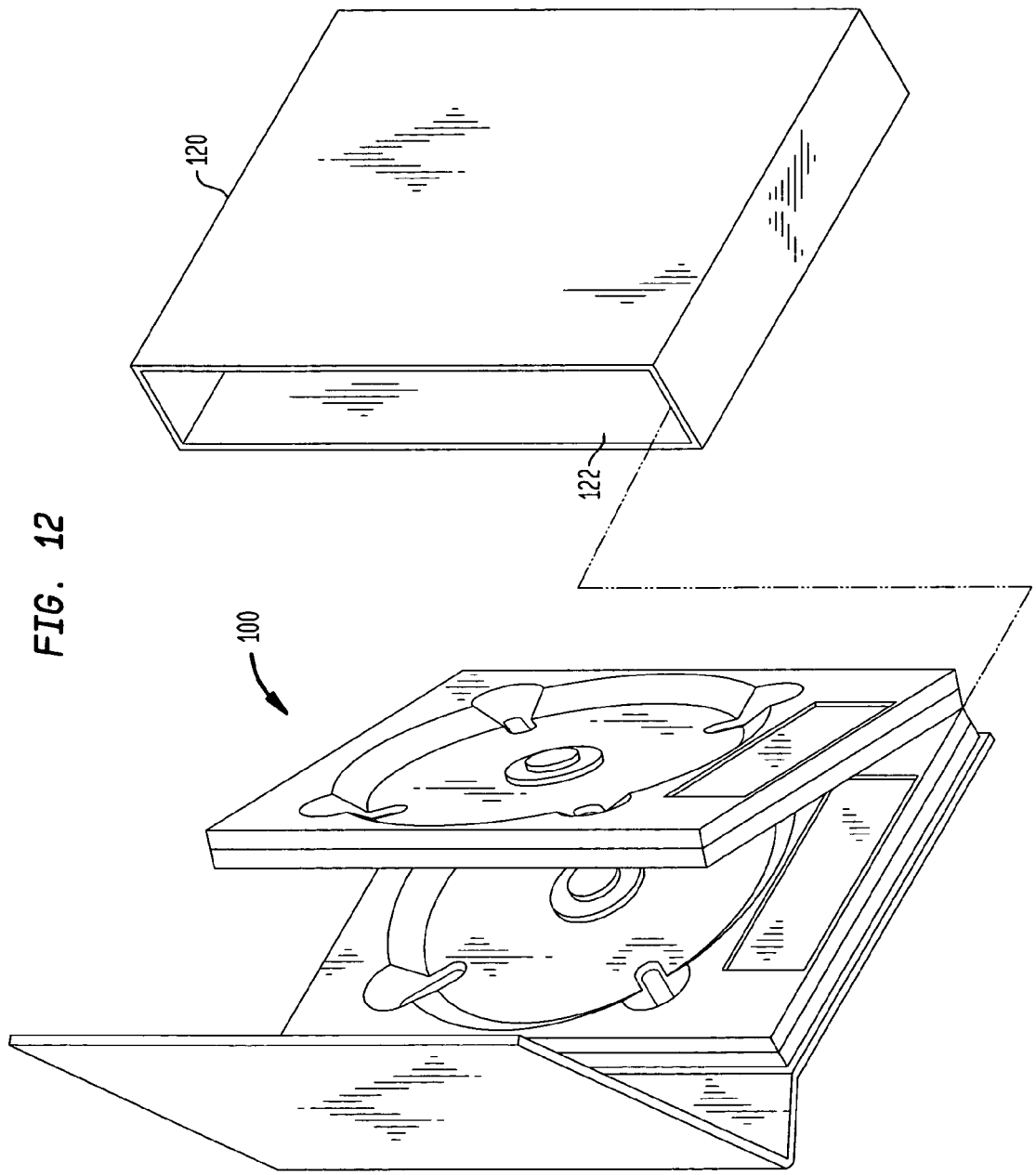
FIG. 12 shows a perspective view of the package shown in FIG. 11 and a slip case.
Figure 13:
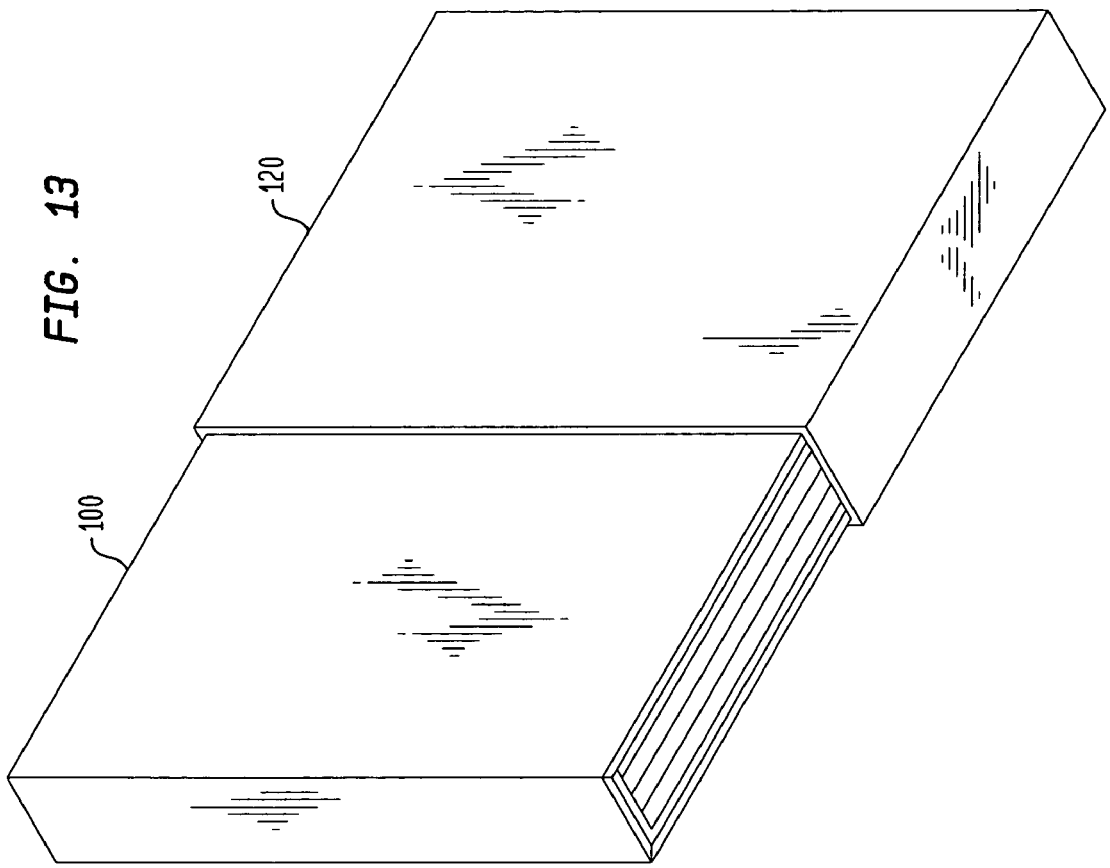
FIG. 13 shows a perspective view of the package shown in FIG. 11 partially slid into the slip case.

As shown in FIGS. 12 and 13, the media package 100 shown in FIG. 11 may be advantageously combined with a slip case 120 that is shaped to closely receive the closed package 100. As shown in FIGS. 12 and 13, the slip case 120 includes an open side 122 that allows the closed package 100 to be slid into the slip case 120.

Figure 15:
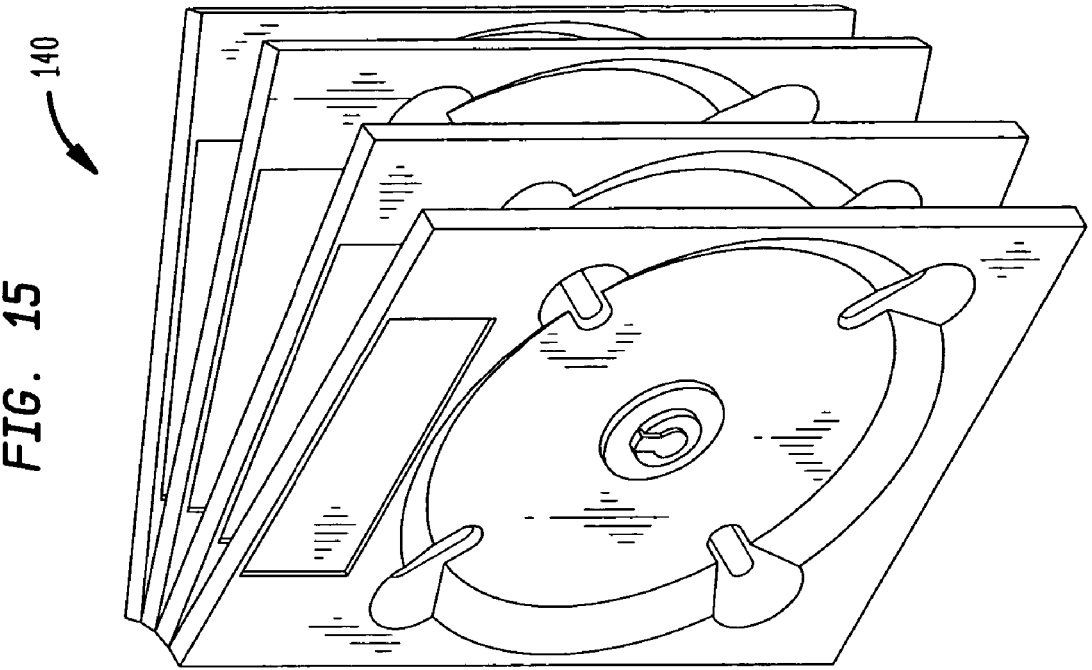
FIGS. 14 and 15 show alternative perspective views of a hinged tray assembly in accordance with an aspect of the invention.
Figure 14:
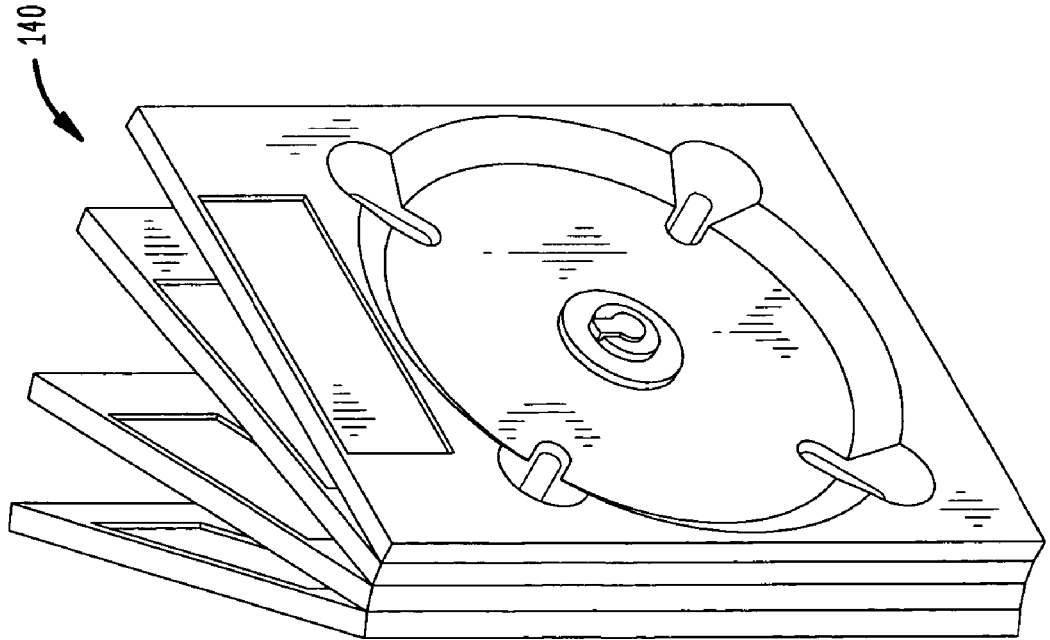
Figure 16:
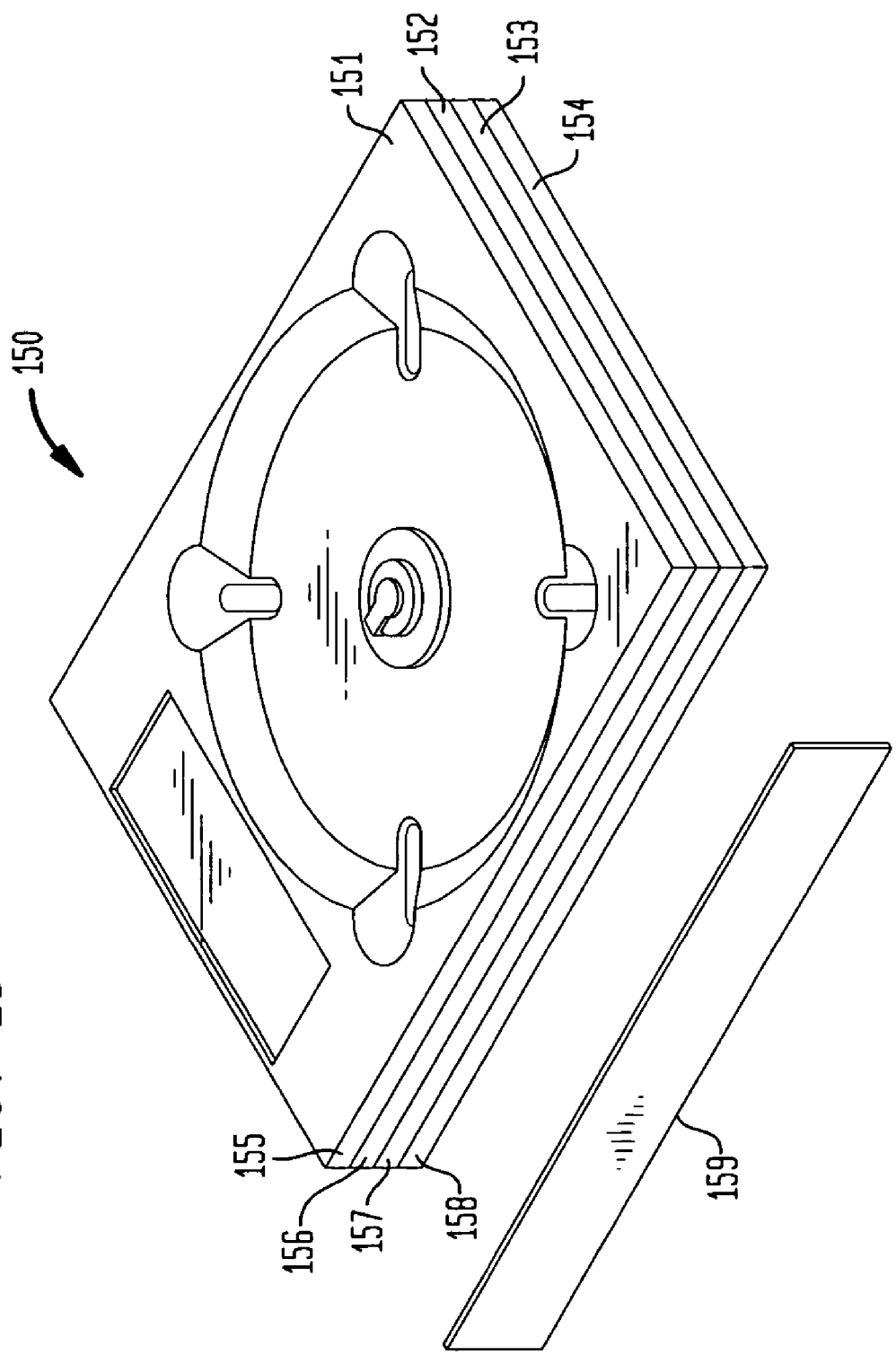
FIG. 16 shows a perspective view of a hinged tray assembly and a hinge member in accordance with an aspect of the invention.

FIGS. 14 and 15 show alternative perspective views of a tray assembly 140 that may be used in a media package according to aspects of the invention. According to a further aspect of the invention, hinged tray assemblies 140 are constructed separately from the jackets. FIG. 16 illustrates a technique for manufacturing a single hinged tray assembly 150. According to this technique, a selected number of trays 151, 152, 153 and 154 is stacked into a desired configuration. The trays include hinge edges 155, 156, 157 and 158 that are lined up in the stack for receiving a hinging member 159. As mentioned above, the hinging member 159 may suitably be implemented using tape, a film, or other material that, on the one hand, is flexible enough to allow the trays to hinge freely with respect to each other while, on the other hand, is sufficiently strong to prevent the hinging member from splitting apart along the hinge lines. The hinging member may be affixed to the hinging surface in any of a number of ways, including using an adhesive, a heat-based technique, or other bonding techniques. The hinging member may be suitably provided on a roll that is unwound and cut, as desired.

Figure 17:
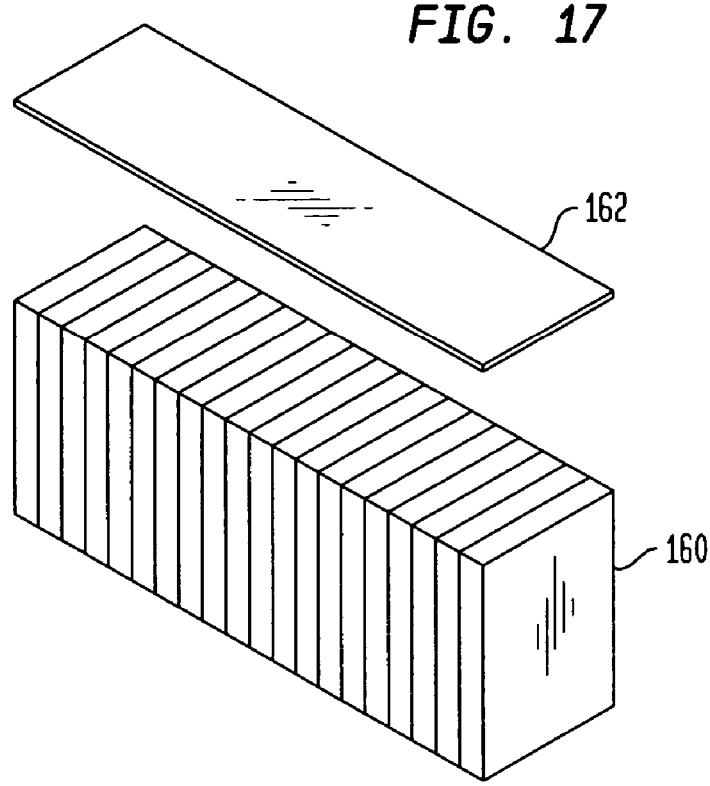
FIG. 17 shows a perspective view of a stack of trays and a swath of hinge material in accordance with a further aspect of the invention.

FIGS. 17 through 20 illustrate a technique for fabricating a plurality of hinged assemblies simultaneously. As shown in FIG. 17, according to this technique, a plurality of trays 160 is arranged side by side so that their hinge edges are in alignment. The number of trays is a multiple of the number of trays in each hinged assembly in the finished package.

Figure 18:
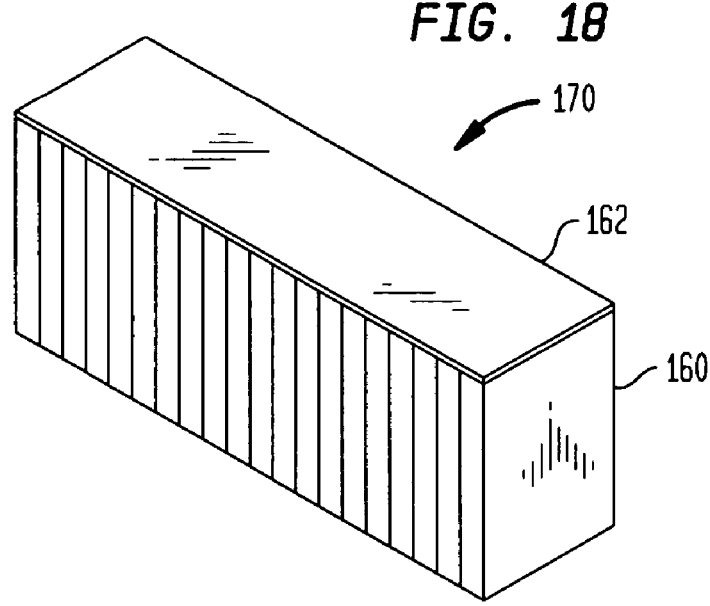
FIG. 18 shows a perspective view of the stack and swath shown in FIG. 17, with the swath affixed to the stack of trays.
Figure 19:
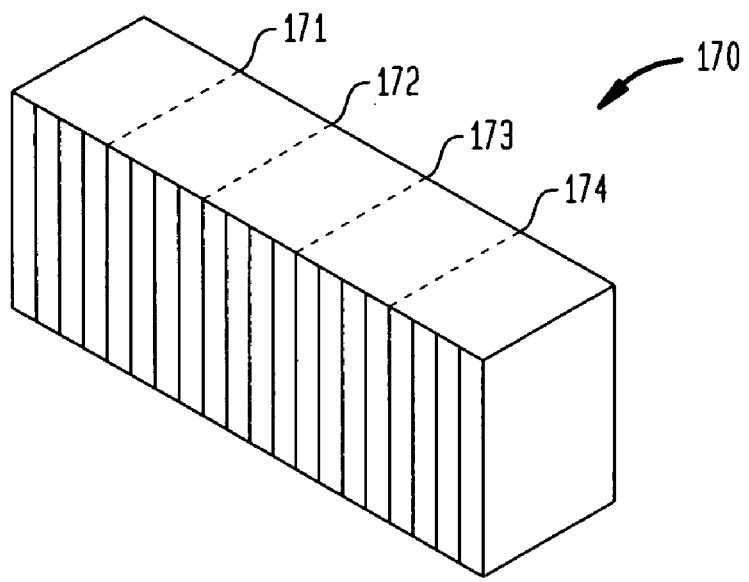
FIG. 19 shows a perspective view of the stack and swath shown in FIG. 18, with lines marked for cutting the swath.
Figure 20:
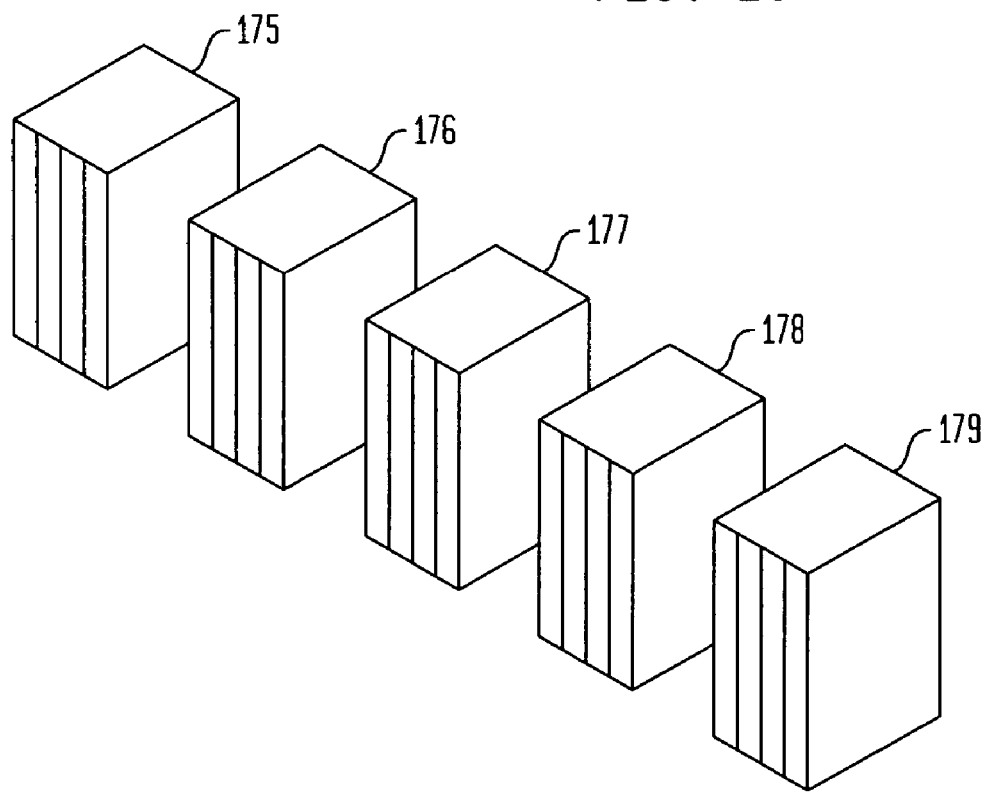
FIG. 20 shows the stack and swath shown in FIG. 19, separated into individual hinge assemblies.

A swath of hinge material 162 is then prepared, having dimensions corresponding to the size of the combined hinge edges. As shown in FIG. 18, the swath of hinge material 162 is then affixed onto the hinge edges of the trays 160 to form an integral unit 170. As shown in FIG. 19, the swath of hinge material is then cut between trays at regular intervals 171, 172, 173 and 174, each interval including the desired number of trays. As shown in FIG. 20, individual hinged assemblies 175, 176, 177, 178 and 179 are then separated. The hinged assemblies are then mounted into jackets, as described above. The swath of hinge material may be cut, for example, in a single stroke using a bar having cutting blades mounted thereon. Of course, the cuts may also be made one at a time.

Figure 21:
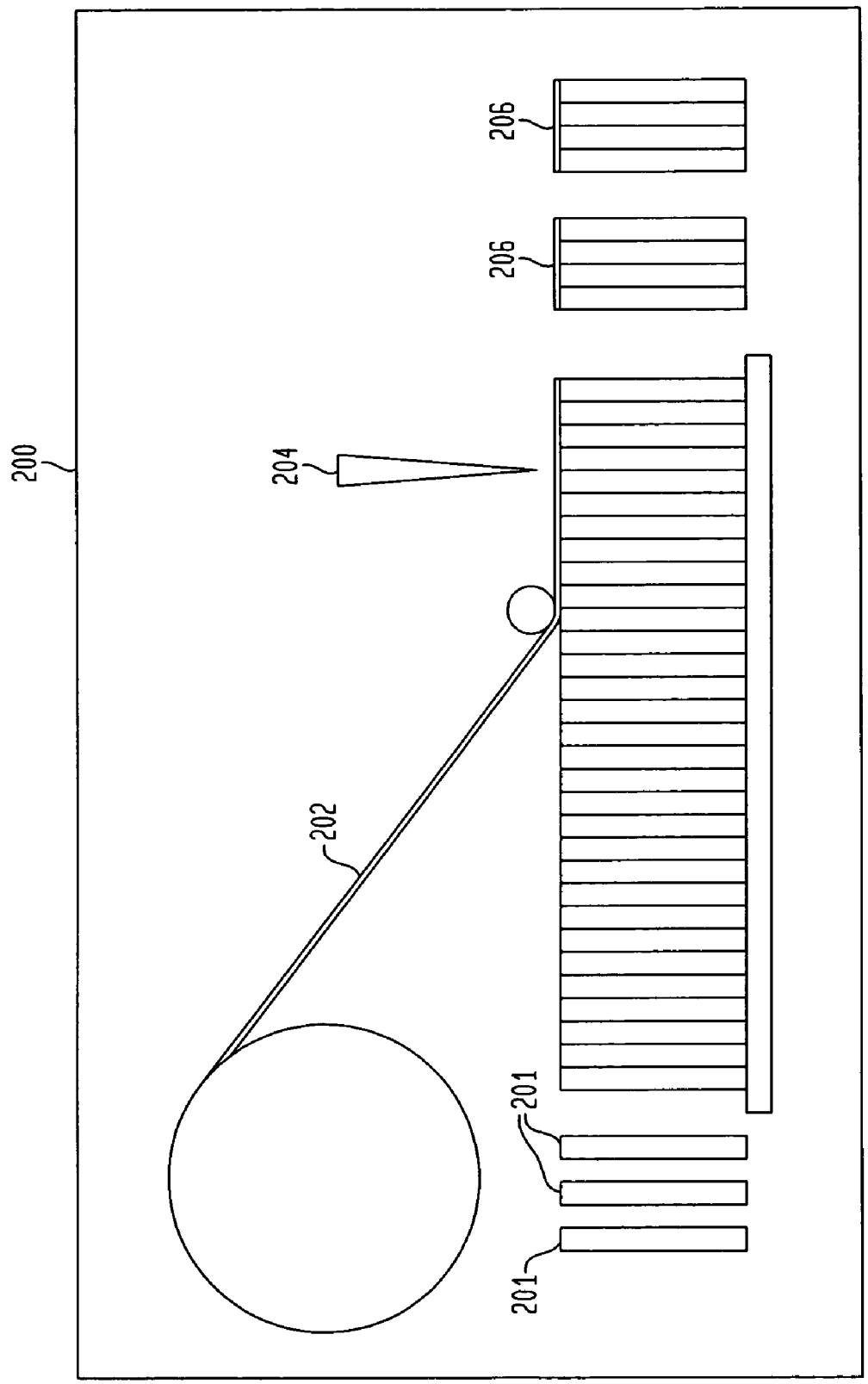
FIG. 21 shows a diagram of a binding machine according to a further aspect of the invention.

FIG. 21 shows another technique for fabricating hinged assemblies in accordance with a further aspect of the invention. According to this aspect of the invention, trays 201 are fed into a binding machine 200. The trays are fed into the machine such that their hinge edges are lined up with each other to receive a hinging material 202. This can be done, for example, by providing a fixture for holding the trays. As the trays are advanced through the machine, the machine automatically applies hinge material 202 to the hinge edges of the trays. A blade 204, or other cutting device, automatically cuts the hinge material 22 between trays to produce hinged assemblies 206 having the desired number of trays.

Figure 22:
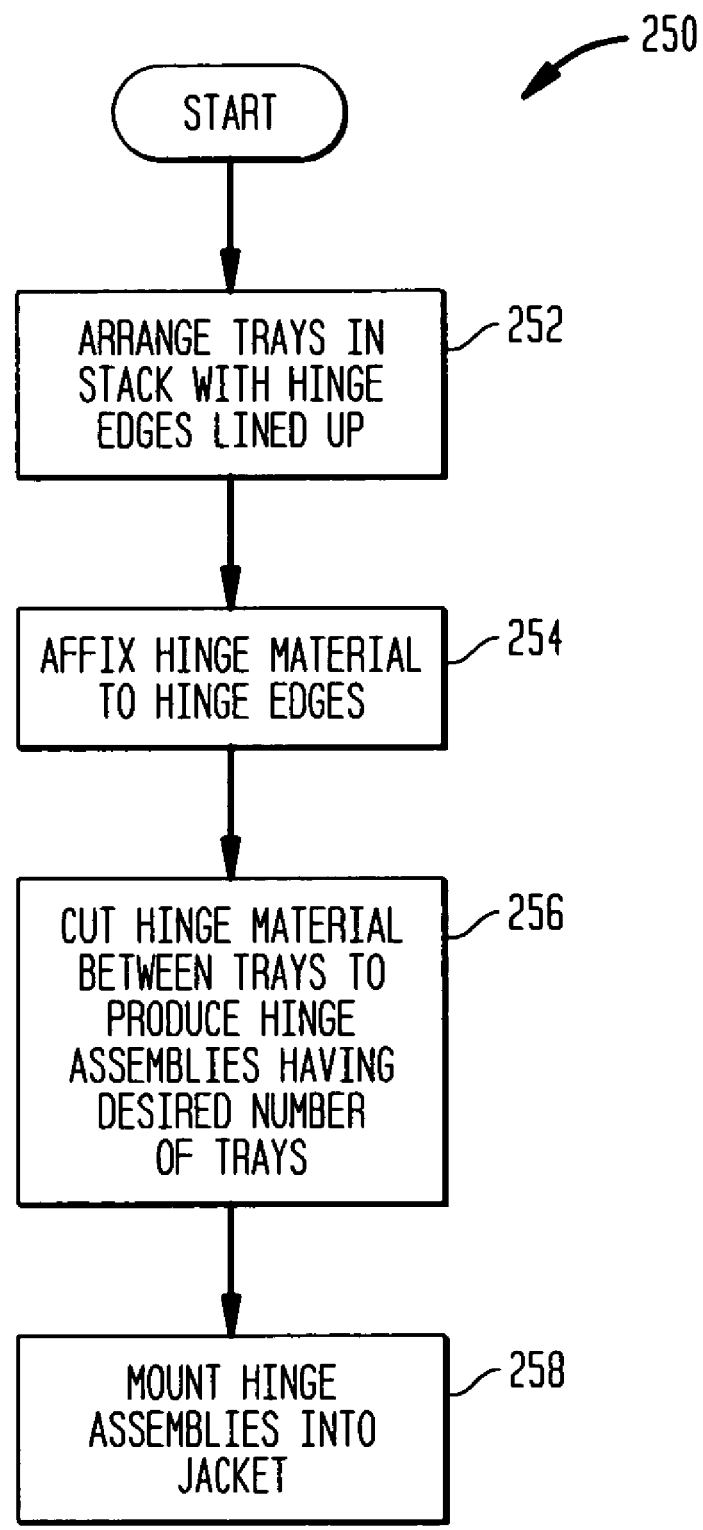
FIG. 22 shows a flowchart illustrating a method for making a media package according to an aspect of the invention.
Figure 23:
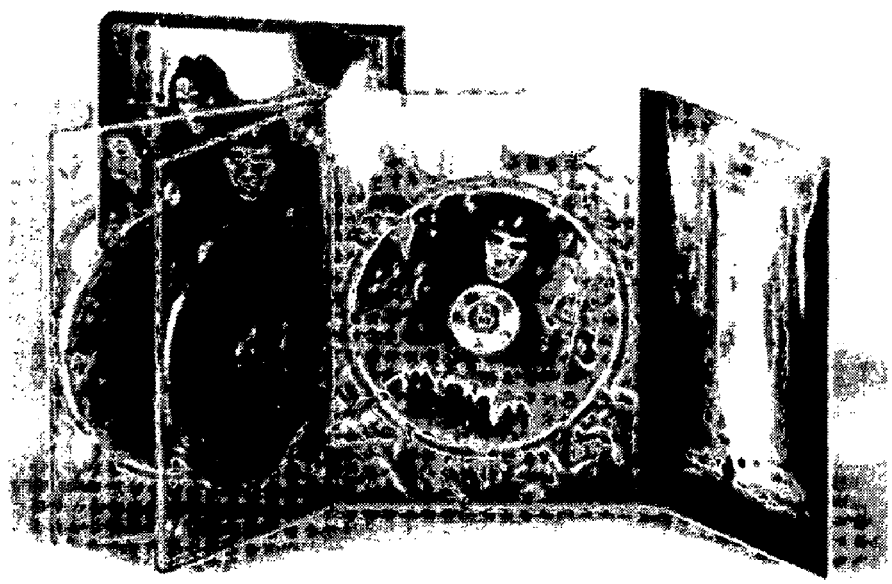
FIGS. 23-26 show perspective views of packages according to aspects of the present invention in which matter has been printed onto the jackets.
Figure 24:
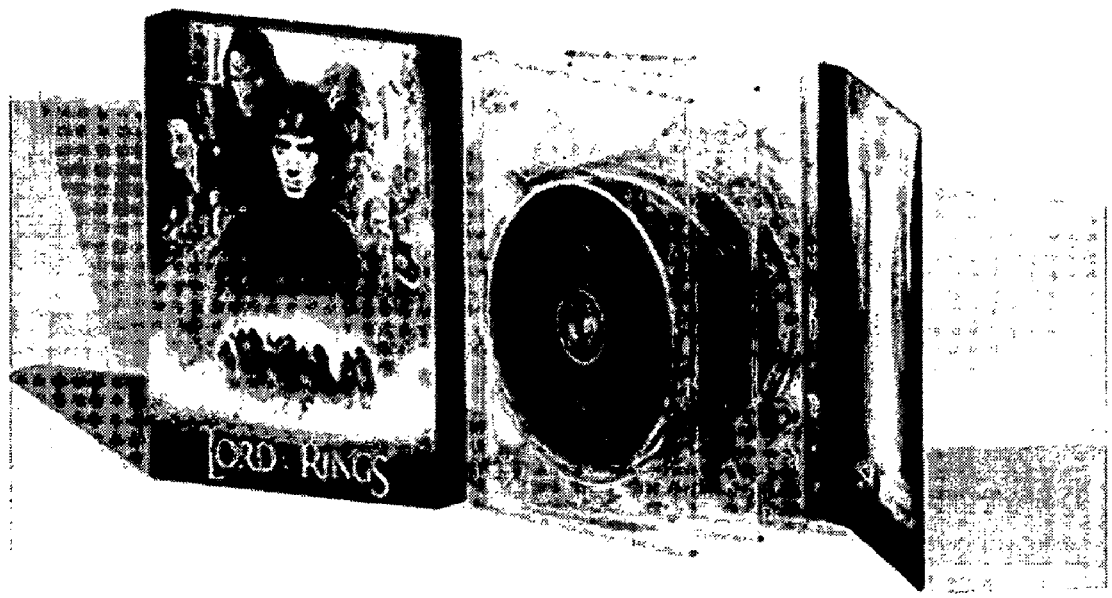
Figure 25:
Figure 26:

FIG. 22 shows a flowchart illustrating a method 250 for making a media package according to an aspect of the invention. In step 252, a set of disc-holding trays is arranged into a stack. The trays each have a hinge edge, and these hinge edges are lined up in the stack. In step 254, a hinging material is affixed to the hinge edges to hinge the trays together. In step 256, the hinging material is cut between trays to produce individual hinge assemblies having a desired number of trays. In step 258, the hinge assemblies are mounted into a jacket to form the finished package. The jacket may be fabricated to include text, graphics, or other esthetic or informational components. It is contemplated that a high-speed printing technique may be used in the fabrication of the jackets.

FIGS. 23 through 26 show perspective views of packages 260, 270, 280 and 290 according to aspects of the present invention, in which matter has been printed onto the jackets.

Figure 27:
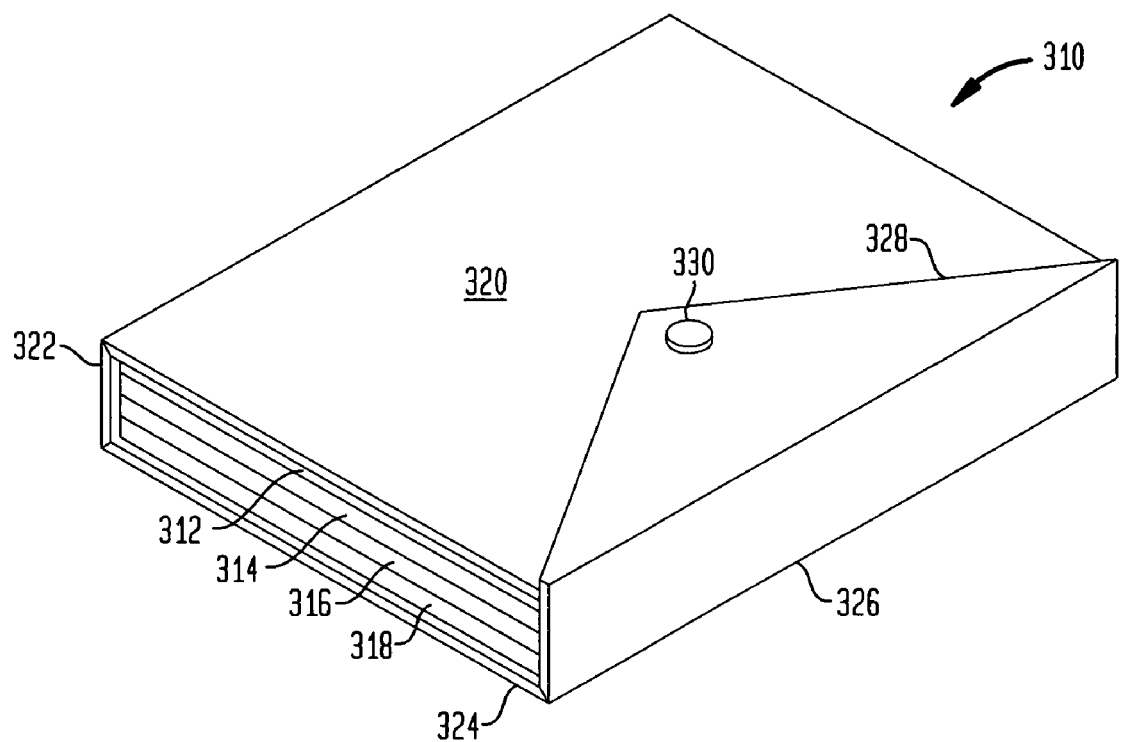
FIG. 27 shows a perspective view of a package according to a further aspect of the invention, wherein the package includes fastening means for holding the package closed.

Further aspects of the invention are directed to packages including structures for holding the packages closed. FIG. 27 shows a perspective view of a package 310, in which a stack of four trays 312, 314, 316 and 318 is hingeably mounted inside a jacket comprising a front panel 320, a spine panel 322, and a back panel 324. It will be seen that the package 310 further includes a wraparound panel 326 extending from the back panel 324, and a wraparound flap 328 extending from the wraparound panel 326.

The wraparound panel 326 and wraparound flap 328 are positioned and shaped to fold closely around the stack of trays 312-318 and the jacket front panel 320. The flap 328 is provided with a fastener 330 for removably attaching the flap 328 to the front panel 320. The fastener 330 may be implemented using a snap with a first mating element mounted to the inner surface of the flap 328 and a second mating element mounted to the front panel 320. Alternatively, the fastener 330 may be implemented using a pair of hook-and-loop fasteners, magnets, or the like, between the inner surface of the flap 328 and the front panel 320.

The wraparound panel 326 and the wraparound flap 328 may suitably be fabricated from the same sheet of material as the other jacket panels 320, 322 and 324. As described above, suitable materials include paperboard, cardboard, plastic, and the like. The wraparound panel 326 and wraparound flap 328 may be scored to facilitate their folding around the stack of trays 312-318.

In the FIG. 27 package 310, the stack of trays 312-318 are hinged at the spine panel 322. The wraparound panel 326 is located opposite the spine panel 322, and thus prevents the stack of trays 312-318 from being fanned open when the flap 328 is attached to the front panel 320. If desired, one or more additional wraparound panels and flaps may be provided, which wrap around either the top edge or the bottom edge of the stack of trays 312-318, or around both the top and bottom edges of the stack of trays 312-318.

Figure 27A:
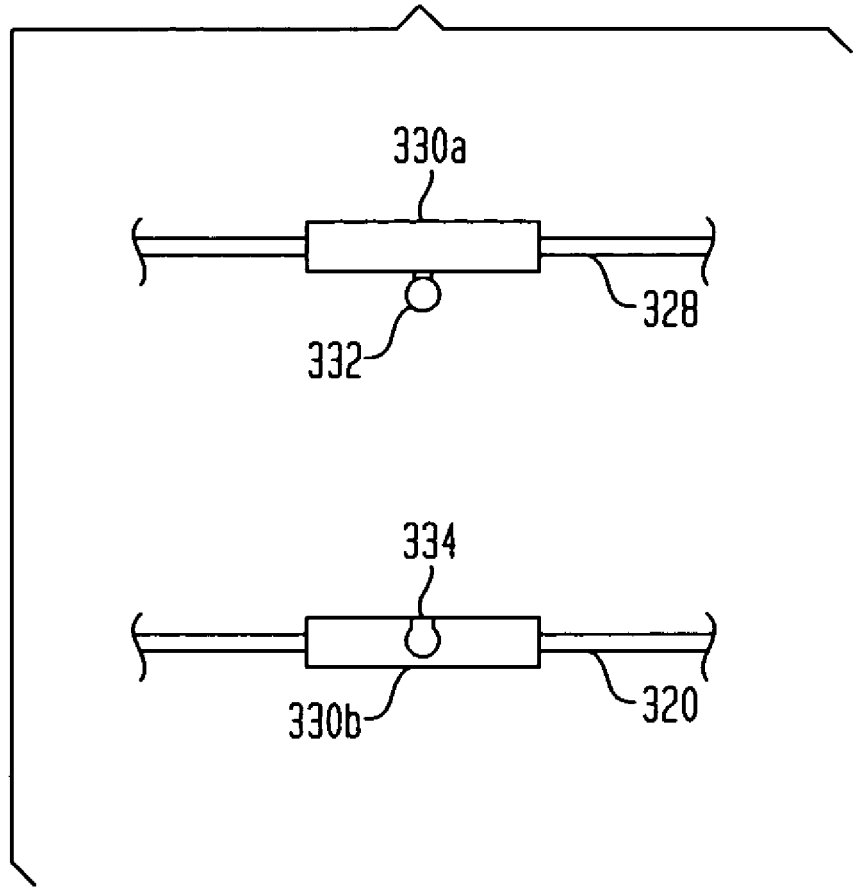
FIGS. 27A and 27B show side views of a fastening arrangement suitable for use in a package such as the one shown in FIG. 27.
Figure 27B:
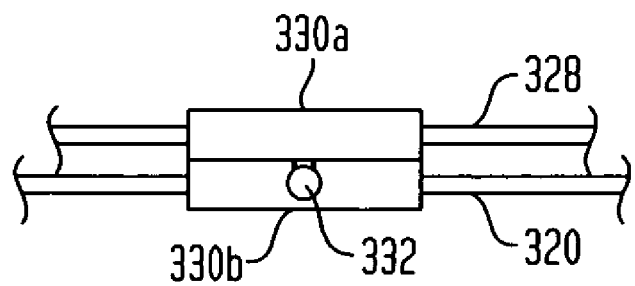

FIGS. 27A and 28B show side views of a fastening arrangement suitable for use with a package such as the one shown in FIG. 27. As shown in FIG. 27A, the fastening arrangement includes an upper fastening element 330a mounted into the wraparound flap 328. A ball-shaped nub 332 projects downward from the upper fastening element 330a. The fastening arrangement further includes a lower fastening element 330b mounted into the front panel 320. The lower fastening element 330b includes a cavity 334 that is shaped to closely receive the nub 332 projecting downward from the upper fastening element 330a. The upper and lower fastening elements 330a and 330b are positioned with respect to each other on the wraparound flap 328 and the front panel 320 such that when the package 310 is closed up, the fastening elements 330a and 330b line up with each other.

As shown in FIG. 27A, the mouth of the cavity 334 has a diameter that is slightly smaller than the diameter of the nub 332. The lower fastening element 334 is fabricated from a slightly deformable material that allows the nub 332 to be forced through the mouth of the cavity 334. The nub 332 and cavity 334 are dimensioned to allow the two fastening elements 330a and 330b to be snapped securely together, while also allowing them to be readily unsnapped. The fastening elements 330a and 330b may be suitably fabricated, for example, from a hard plastic or similar material.

Figure 28:
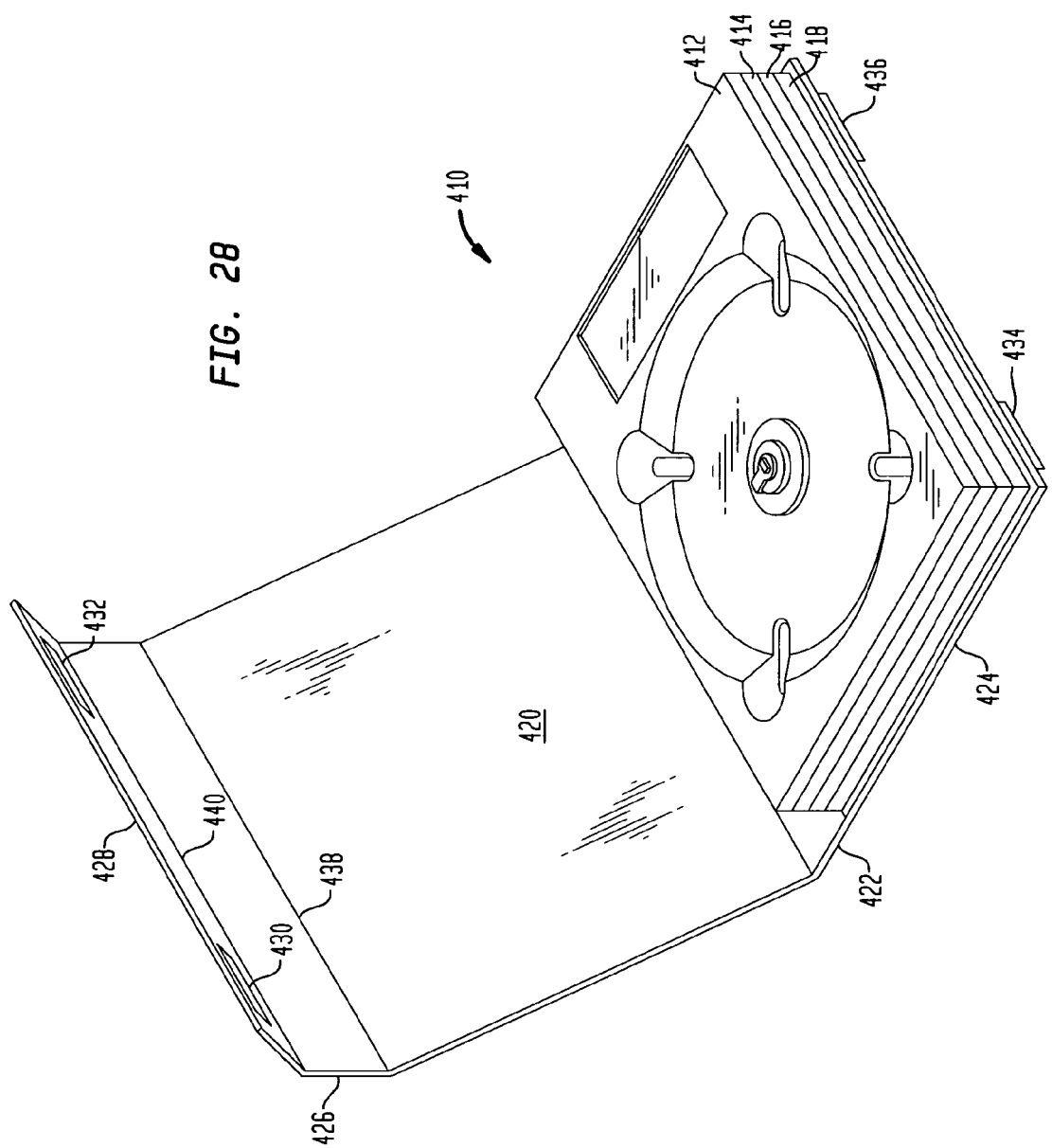
FIGS. 28-30 show perspective views of packages according to further aspects of the invention, wherein there are provided alternative fastening means for holding the packages closed.

FIG. 28 shows a perspective view of a package 410 including an alternative closing arrangement. The package 410 includes a stack of trays 412, 414, 416 and 418 that are hingeably mounted to each other at one edge. The stack of trays 412-418 is mounted into a jacket including a front panel 420, a spine panel 422, and a rear panel 424. Specifically, the bottom surface of the bottom tray 418 in the stack is mounted to the inner surface of the rear panel 424.

The jacket further includes a wraparound panel 426 and a wraparound flap 428 that are positioned and shaped to fold closely around the stack of trays. The wraparound flap 428 includes a pair of fasteners 430 and 432 that attach to mating fasteners 434 and 436 mounted to the outer surface of the rear panel 424. The fasteners 430-436 may be implemented using snaps, hook-and-loop fasteners, magnets, or the like.

If magnets are used for the fasteners 430-436, it may be desirable to conceal the magnets for esthetic reasons. This concealment may be accomplished in a number of ways. For example, if the jacket panels are fabricated from paperboard, the magnets may be concealed by gluing them between layers of paperboard. Also, it would be possible to conceal the magnets by using thin sheets of material that are glued over the magnets.

The wraparound panel 426 and wraparound flap 428 may suitably be fabricated from the same sheet of material as the other jacket panels. As shown in FIG. 28, a first score line 438 separates the wraparound panel 426 from the front panel 420, and a second score line 440 separates the wraparound flap 428 from the wraparound panel 426. The two score lines 438 and 440 facilitate the folding of the wraparound panel 426 and flap 428 around the stack of trays 412-418.

Figure 29:
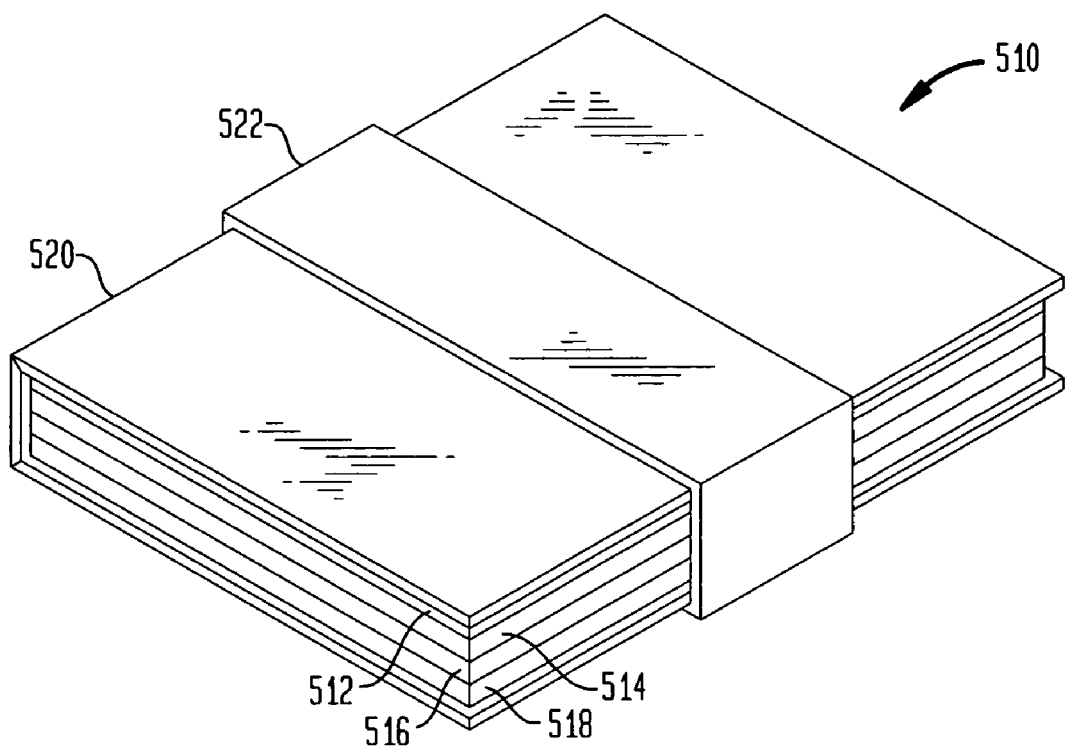

FIG. 29 shows a perspective view of a package 510 including another closing arrangement. The package 510 includes a stack of trays 512, 514, 516 and 518 that are hingeably mounted to each other inside a jacket 520. The package 510 is held closed by a "belly band" 522 that fits closely around the "waist" of the package 510. The belly band 522 may be suitably fabricated from a strip of plastic, paper, paperboard, cardboard, or the like. The strip is scored and folded, and then the two ends of the strip are attached to each other to form a band. The band is shaped such that it may be slipped over one end of the package 510 and then slid into position to hold the package 510 closed. The package 510 would then be opened by sliding the band 522 off the package 510. If the band 522 is fabricated from paper, the band 522 may simply be torn off the package 510. If desired, the band 522 may be provided with printed matter, such as text or graphics.

It would also be possible to form a band 522 from a strip having ends that are removably attached to each other using, for example, a snap, hook-and-loop fasteners, magnets, or the like. In that case, the package 510 would be closed by wrapping the two ends of the strap around the package 510 and then attaching the two ends together. The package 510 would then be opened by detaching the two ends from each other.

Figure 30:
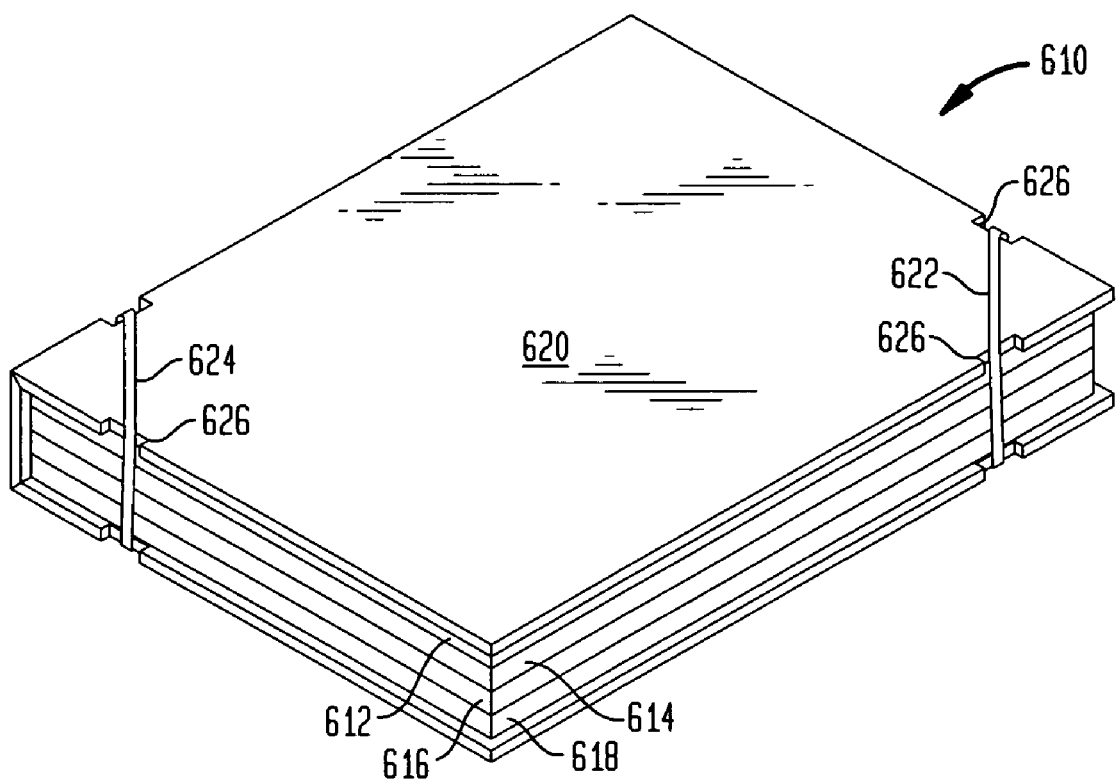

FIG. 30 shows a perspective view of a package 610 including another closing arrangement. The package 610 includes a stack of trays 612, 614, 616 and 618 that are hingeably mounted to each other inside a jacket 620. The package 610 is held closed by an elastic band having first and second ends 622 and 624 that loop around opposite corners of the package 610. In order to help the elastic band ends 622 and 624 maintain their position on the package 610, suitably positioned notches 626 may be cut into the jacket 620. As shown in FIG. 30, the notches 626 may extend across the trays 612-618.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A package for holding media discs, comprising:
    a hinged tray assembly, including (i) a plurality of stacked trays, each tray having a hinge edge, a second edge, and a central cavity that is shaped to receive a media disc and includes means for supporting the media disc in the central cavity, the trays being positioned with respect to each other such that when the tray assembly is in a closed configuration, the trays are arranged in a stack with their hinge edges aligned to define a hinge side of the tray assembly, with their second edges aligned to define a second side of the tray assembly, and with the bottom-most of said stacked trays defining a bottom surface of said tray assembly and the uppermost of said stacked trays defining an upper surface of said tray assembly, and (ii) a flexible hinge member affixed to the hinge edges of the trays along the hinge side of the tray assembly;
    a jacket formed from a substantially rigid material, comprising a series of panels hingedly connected one to the next, each of said panels having an interior surface;
    the bottom surface of said tray assembly being mounted to the interior surface of a first of said panels, said panels being sized and arranged such that the jacket may be placed in a closed position with a second of said panels disposed adjacent one of said hinge side and said second side of said tray assembly, and with a third of said panels disposed adjacent said upper surface of said tray assembly, said second and third panels being unsecured to said tray assembly.

2. The package of claim 1, wherein said second panel is sized and arranged such that when the jacket is placed in said closed position, said second panel is disposed adjacent said hinge side of said tray assembly.

3. The package of claim 1, wherein said second panel is sized and arranged such that when the jacket is placed in said closed position, said second panel is disposed adjacent said second side of said tray assembly.

4. The package of claim 1, wherein said first panel defines a rear jacket panel, said second panel defines a spine panel, and said rear jacket panel and said spine panel are connected to each other along a first crease line.

5. The package of claim 4, wherein said third panel defines a front jacket panel, and said front jacket panel and said spine panel are connected to each other along a second crease line.

6. The package of claim 1, wherein said second panel defines a spine panel, said third panel defines a front jacket panel, and said front jacket panel and said spine panel are connected to each other along a second crease line.

7. The package of claim 1, further comprising a slip case that fits closely around the tray assembly and jacket when they are in a closed configuration.

8. The package of claim 1, wherein the jacket further includes a flap extending from one of said first panel and said third panel, the flap being attachable to the other of said first panel and said third panel to hold the package closed.

9. The package of claim 1, further including a first fastening element mounted to the flap and a second, mating fastening element mounted to said other panel.

10. The package of claim 9, wherein said first and second fastening elements snap together.

11. The package of claim 9, wherein said first and second fastening elements comprise a hook-and-loop fastening system.

12. The package of claim 9, wherein said first and second fastening elements comprise magnets.

13. The package of claim 1, further comprising a band that fits closely around the package to hold it in a closed position.

14. The package of claim 1, further comprising an elastic band that loops around opposite corners of the package to hold it in a closed position.

15. The package of claim 14, wherein said first and third panels include notches defined therein for receiving the elastic band.

* * * * *